US012617707B2

(12) United States Patent
Debnath et al.

(10) Patent No.: US 12,617,707 B2
(45) Date of Patent: May 5, 2026

(54) OPTICAL FIBER AND A GLASS PREFORM MANUFACTURING METHOD

(71) Applicant: Sterlite Technologies Limited, Gurugram (IN)

(72) Inventors: Debangshu Debnath, Gurugram (IN); Saikishore Chadaram, Gurugram (IN); Sandeep Gaikwad, Gurugram (IN); Sudhakar Reddy, Gurugram (IN)

( * ) Notice: Subject to any disclaimer, the term of this patent is extended or adjusted under 35 U.S.C. 154(b) by 166 days.

(21) Appl. No.: 18/471,180

(22) Filed: Sep. 20, 2023

(65) Prior Publication Data

US 2024/0327267 A1 Oct. 3, 2024

(30) Foreign Application Priority Data

Mar. 29, 2023 (IN) .............................. 202311023174

(51) Int. Cl.
| | |
|---|---|
| *C03B 37/012* | (2006.01) |
| *C03B 37/014* | (2006.01) |
| *C03B 37/027* | (2006.01) |

(52) U.S. Cl.
CPC .... *C03B 37/0146* (2013.01); *C03B 37/01288* (2013.01); *C03B 37/027* (2013.01); *C03B 2205/60* (2013.01)

(58) Field of Classification Search
CPC .......... C03B 37/01288; C03B 37/0146; B29C 48/302
See application file for complete search history.

(56) References Cited

U.S. PATENT DOCUMENTS

| | | | | |
|---|---|---|---|---|
| 5,213,737 A * | 5/1993 | Ford | ....................... | B29C 48/04 264/109 |
| 5,240,488 A * | 8/1993 | Chandross | ........ | C03B 37/01211 65/435 |
| 6,253,580 B1 * | 7/2001 | Gouskov | ........... | C03B 37/01426 65/421 |
| 6,257,863 B1 * | 7/2001 | Otte | ........................ | B29C 48/06 425/465 |
| 2003/0230118 A1 * | 12/2003 | Dawes | ................ | C03B 37/0122 65/393 |
| 2004/0050110 A1 * | 3/2004 | Berkey | .................. | G02B 6/105 65/393 |
| 2007/0080613 A1 * | 4/2007 | Gupta | ............... | C03B 37/01202 312/31 |
| 2007/0240454 A1 * | 10/2007 | Brown | .................. | C03B 37/027 65/508 |
| 2015/0329403 A1 * | 11/2015 | Adigrat | ............... | C03B 37/0126 65/508 |
| 2017/0233283 A1 * | 8/2017 | Ashrafi | .............. | G02B 6/02314 385/124 |
| 2020/0131073 A1 * | 4/2020 | Caronna | .......... | C03B 37/01453 |
| 2020/0283328 A1 * | 9/2020 | Toyosaki | ......... | C03B 37/01446 |

(Continued)

*Primary Examiner* — Andrew D Graham
(74) *Attorney, Agent, or Firm* — Steven R. Fairchild

(57) ABSTRACT

The present disclosure relates to a method and an extrusion apparatus (100, 200) to manufacture a soot preform (130). The extrusion apparatus (100 and 200) includes a feed-hopper (104) to feed silica slurry (102) which is pushed within the barrel (106), an iris frame (116) exhibiting a variable diameter to control a diameter of the soot preform (130), drying furnace (118), debinding furnace (122) eliminates moisture and one or more stabilized binders in the soot preform (130) to obtain a glass preform (138) from which an optical fiber (142) is drawn.

8 Claims, 12 Drawing Sheets

(56) References Cited

U.S. PATENT DOCUMENTS

| | | | |
|---|---|---|---|
| 2020/0369553 A1* | 11/2020 | Ponader | ................ C03B 37/029 |
| 2021/0047189 A1* | 2/2021 | Gaikwad | ................ B01J 8/0055 |
| 2021/0047225 A1* | 2/2021 | Gaikwad | ........... C03B 37/01282 |

* cited by examiner

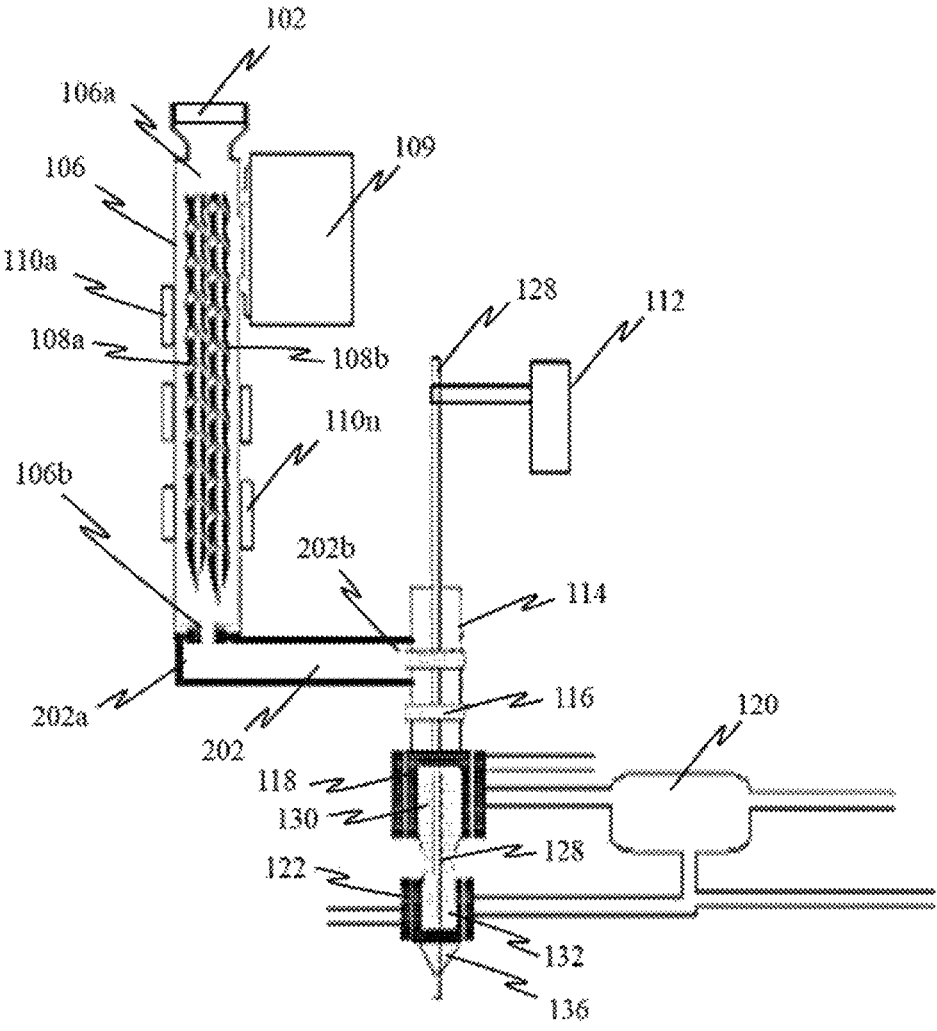
Fig. 2B

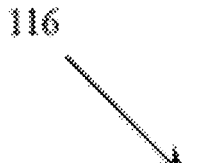
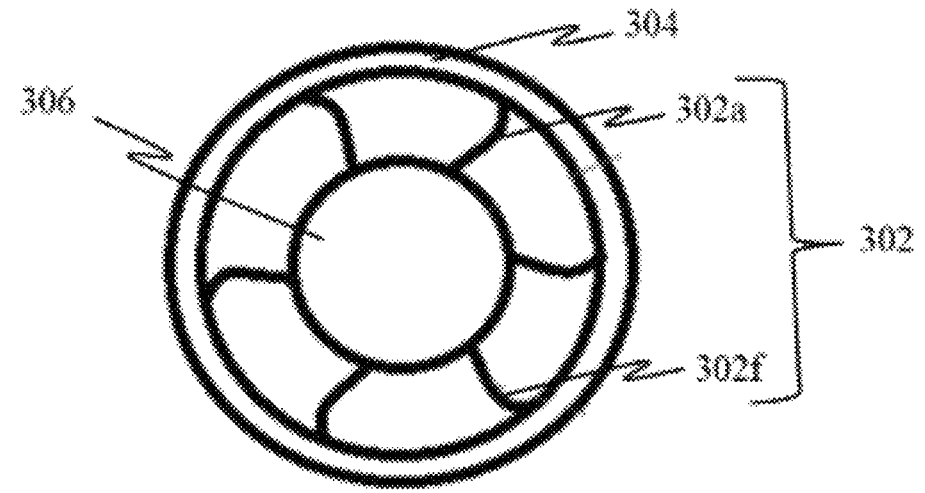
Fig. 3

600

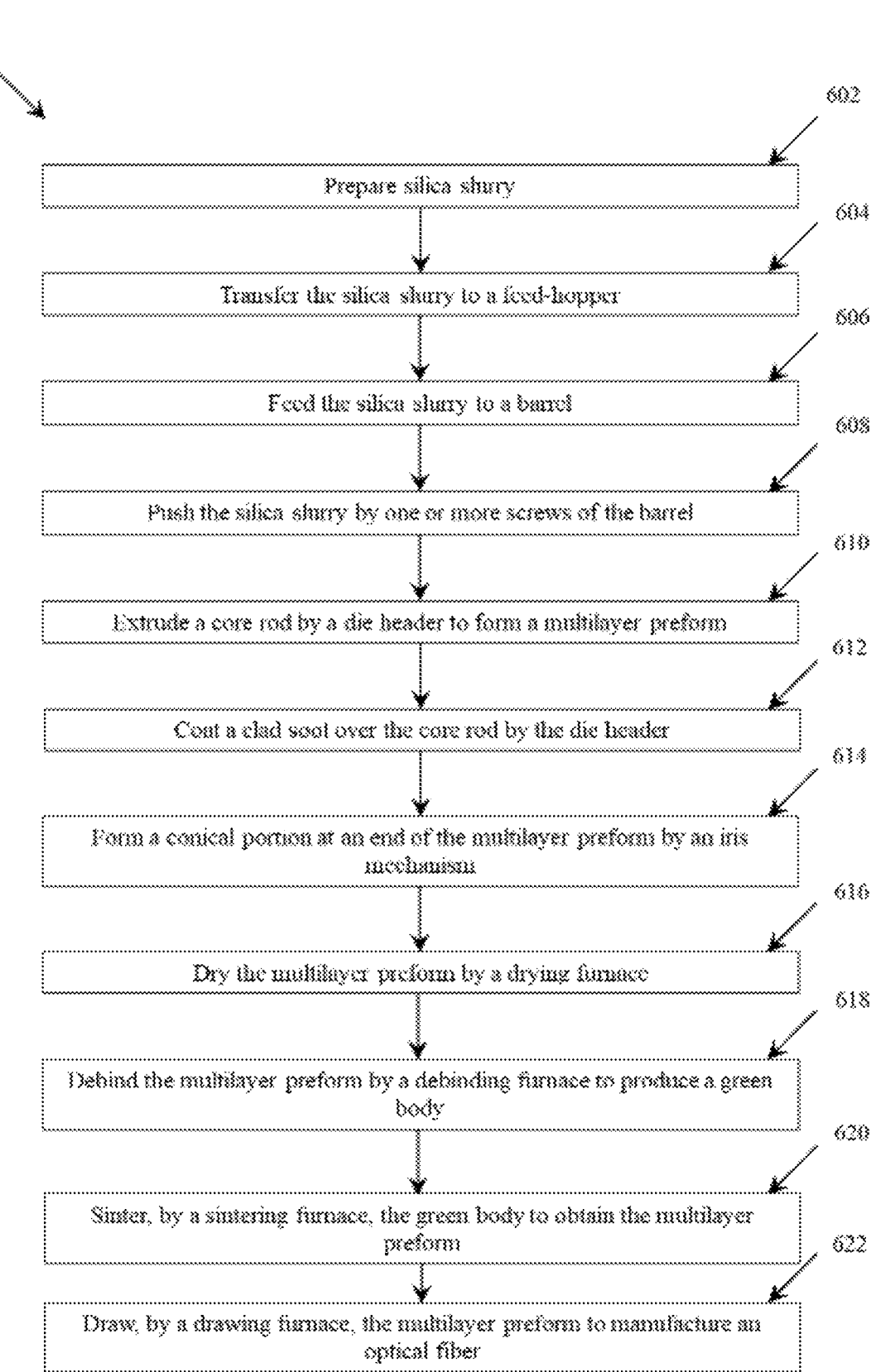

602

Prepare silica slurry

604

Transfer the silica slurry to a feed-hopper

606

Feed the silica slurry to a barrel

608

Push the silica slurry by one or more screws of the barrel

610

Extrude a core rod by a die header to form a multilayer preform

612

Coat a clad soot over the core rod by the die header

614

Form a conical portion at an end of the multilayer preform by an iris mechanism

616

Dry the multilayer preform by a drying furnace

618

Debind the multilayer preform by a debinding furnace to produce a green body

620

Sinter, by a sintering furnace, the green body to obtain the multilayer preform

622

Draw, by a drawing furnace, the multilayer preform to manufacture an optical fiber

Fig. 6

OPTICAL FIBER AND A GLASS PREFORM MANUFACTURING METHOD

COPYRIGHT STATEMENT

CROSS-REFERENCE TO RELATED APPLICATIONS

This application claims the benefit of Indian Application No. 202311023174 titled "OPTICAL FIBER AND A GLASS PREFORM MANUFACTURING METHOD" filed by the applicant on Mar. 29, 2023, which is incorporated herein by reference in its entirety.

FIELD OF THE INVENTION

Embodiments of the present invention relate to the field of telecommunication fiber cables and more particularly, relate to an apparatus to manufacture an optical fiber and a glass preform and a method thereof.

DESCRIPTION OF THE RELATED ART

Optical fiber is the leading alternative to traditional materials used for data signal communication such as copper wiring. These are essentially ultra-thin light conduits, wherein light is pumped into one end, propagates forward within and through the fiber, whether bent or straight, and ultimately emerges at the other end. Optical fiber is now widely utilized in a variety of electronic devices and systems to facilitate the high-speed communication of voice, video, and data signals at high bandwidths.

Optical fibers are widely used in optical cables. Generally, an optical fiber is made of a core that transmits light and a cladding that surrounds the core. The refractive index of the core is generally higher than the refractive index of the cladding.

Usually, optical fibers are drawn from a glass preform, which is a cylindrical body made up of glass. Conventional glass preform manufacturing techniques have low deposition efficiency, which leads to loss in capturing of silica soot particles. Furthermore, manufacturing time is on the higher side (for example more than 15 hours). Further, the use of a vacuum to close the centerline and other holes in the optical fiber preforms has many drawbacks as such vacuum forces can result in a nonsymmetrical centerline profile of the cane.

US patent application U.S. Pat. No. 5,169,421A discloses manufacturing of a silica glass optical preform using an extrusion apparatus. The extrusion apparatus has a ring-shaped die that is expanded and contracted by means of hydraulic pressure for varying the outlet diameter and subsequently varying the diameter of the silica glass optical preform.

Japanese patent application JPH0680436A discloses manufacturing of a porous optical fiber preform by an extrusion apparatus. The extrusion apparatus uses a plastic material for the formation of a cladding layer on the outer portion of the glass core.

Yet another US patent application U.S. Pat. No. 5,314, 520A discloses a method for manufacturing optical fiber preform that requires a porous preform to produce an optical fiber exerting high mechanical strength, can be efficiently manufactured without generating bubbles.

Furthermore, conventional techniques/apparatus/methods of manufacturing optical fiber and glass preform are very costly and cannot exhibit any kind of dimensional variation for the optical fiber and glass preform being manufactured. This increases the cost of production of optical fiber. Alongwith this, maintenance cost associated with the conventional apparatus is high.

Accordingly, to overcome the disadvantages of the prior art, there is an urgent need for a technical solution that overcomes the above-stated limitations in the prior arts by providing an efficient and effective apparatus and method to manufacture optical fibers and glass preforms. Thus. the present invention provides an apparatus for constraining an optical fiber in a draw tower and method thereof.

SUMMARY OF THE INVENTION

Embodiments of the present invention relate to a method for manufacturing an optical fiber comprising steps of forming a soot preform using an extrusion apparatus, drying by way of a drying furnace the soot preform for eliminating physisorbed moisture present in the soot preform such that upon drying a dried soot preform is produced, sintering by way of a sinter furnace the dried soot preform to obtain a glass preform and drawing by way of a draw furnace the glass preform to manufacture the optical fiber.

Further, the step of forming soot preform using an extrusion apparatus characterizes preparing silica slurry by mixing one or more solvents, one or more binders, one or more additives, and silica particles, pushing by way of one or more screws disposed within a barrel, the silica slurry from an inlet end to an outlet end of the barrel and extruding by way of a die header such that the silica slurry is cladded on a core rod to form the soot preform. In particular, the die header comprises an iris frame to vary a diameter of the soot preform.

In accordance with an embodiment of the present invention, the method comprising steps of debinding by way of a debinding furnace, to produce a green body; and sintering, by way of a sinter furnace the green body to obtain the glass preform. In particular, the one or more stabilized binders along with one or more additives are eliminated from the dried soot preform such that upon debinding, the green body is produced.

In accordance with an embodiment of the present invention, the method forms a conical portion at an end of the soot preform by the iris frame by moving a plurality of vane in a radial direction of the iris frame to control a diameter of a central orifice that controls the diameter of the soot preform. In particular, the diameter of the central orifice varies in a range of 35 millimeters (mm) to 350 mm.

In accordance with an embodiment of the present invention, (i) 70% of silica particles of the silica particles have dimension greater than 16 microns and (ii) 30% of silica particles of the silica particles have dimension smaller than 16 microns.

In accordance with an embodiment of the present invention, the one or more solvents lie in a range of 10% to 30% with respect to the silica particles. The one or more solvents may be water-based solvents, alcohol-based solvents, and keto-based solvents.

In accordance with an embodiment of the present invention, the one or more binders lie in a range of 0.01% to 5% with respect to the silica particles. Each binder of the one or more binders is one of, a polypropylene carbonate, a polyvinyl alcohol, a polystyrene, a camphor, a gelatin-based agar, and a stabilizing agent such as dispersant, polymerizing initiator, and plasticizer.

In accordance with an embodiment of the present invention, the silica slurry comprises the silica particles that lie in a range of 40% to 80%. The one or more binders that lie in a range of 1% to 3%, and the one or more solvents that lie in a range of 17% to 59%.

In accordance with an embodiment of the present invention, a diameter of the soot preform is varied in a range of 35 mm to 350 mm with a deviation of +1 mm.

In accordance with an embodiment of the present invention, the method involves mixing, by way of one or more screws, the silica slurry.

In accordance with an embodiment of the present invention, the method comprises converting, by way of the extrusion apparatus the silica slurry into a semi-solid silica slurry.

Another embodiment of the present invention, the extrusion apparatus to manufacture a soot preform characterized in that a feed-hopper adapted to feed silica slurry, a barrel that is disposed beneath the feed-hopper and adapted to receive the silica slurry, a die header to extrude the silica slurry such that the silica slurry is cladded on a core rod to form the soot preform. In particular, the die header comprises an iris frame and the iris frame. The iris frame further comprises a plurality of vanes such that each vane of the plurality of vanes is adapted to move in a radial direction of the iris frame. Further, upon movement of each vane of the plurality of vanes, a central orifice is created that exhibits a variable diameter, and variation in the diameter of the central orifice controls a diameter of the soot preform.

In accordance with an embodiment of the present invention, the extrusion apparatus comprises one or more screws that are disposed within the barrel such that the one or more screws are adapted to mix the silica slurry and push the silica slurry towards the iris frame.

In accordance with an embodiment of the present invention, the extrusion apparatus comprises a drying furnace that is disposed beneath the iris frame, adapted to eliminate physisorbed moisture present in the soot preform to produce a dried soot preform and a debinding furnace that is coupled to the drying furnace and adapted to eliminate one or more stabilized binders and other one or more additives from the dried soot preform to produce a green body. In particular, a glass preform is obtained from the green body such that an optical fiber is drawn from the glass preform.

The foregoing objectives of the present invention are attained by providing an extrusion apparatus to manufacture a soot preform and the method of manufacture thereof.

BRIEF DESCRIPTION OF THE DRAWINGS

So that the manner in which the above-recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention herein will be better understood from the following description with reference to the drawings, in which:

FIG. 2B is a pictorial snapshot illustrating a front view of the extrusion apparatus of FIG. 2A for manufacturing the soot preform with an embodiment of the present invention;

FIG. 3 is a pictorial snapshot illustrating an iris frame of the extrusion apparatus in accordance with an embodiment of the present invention;

FIG. 6 is a flowchart illustrating a method for manufacturing a multilayer preform in accordance with an embodiment of the present invention;

ELEMENT LIST

Figure 1A:
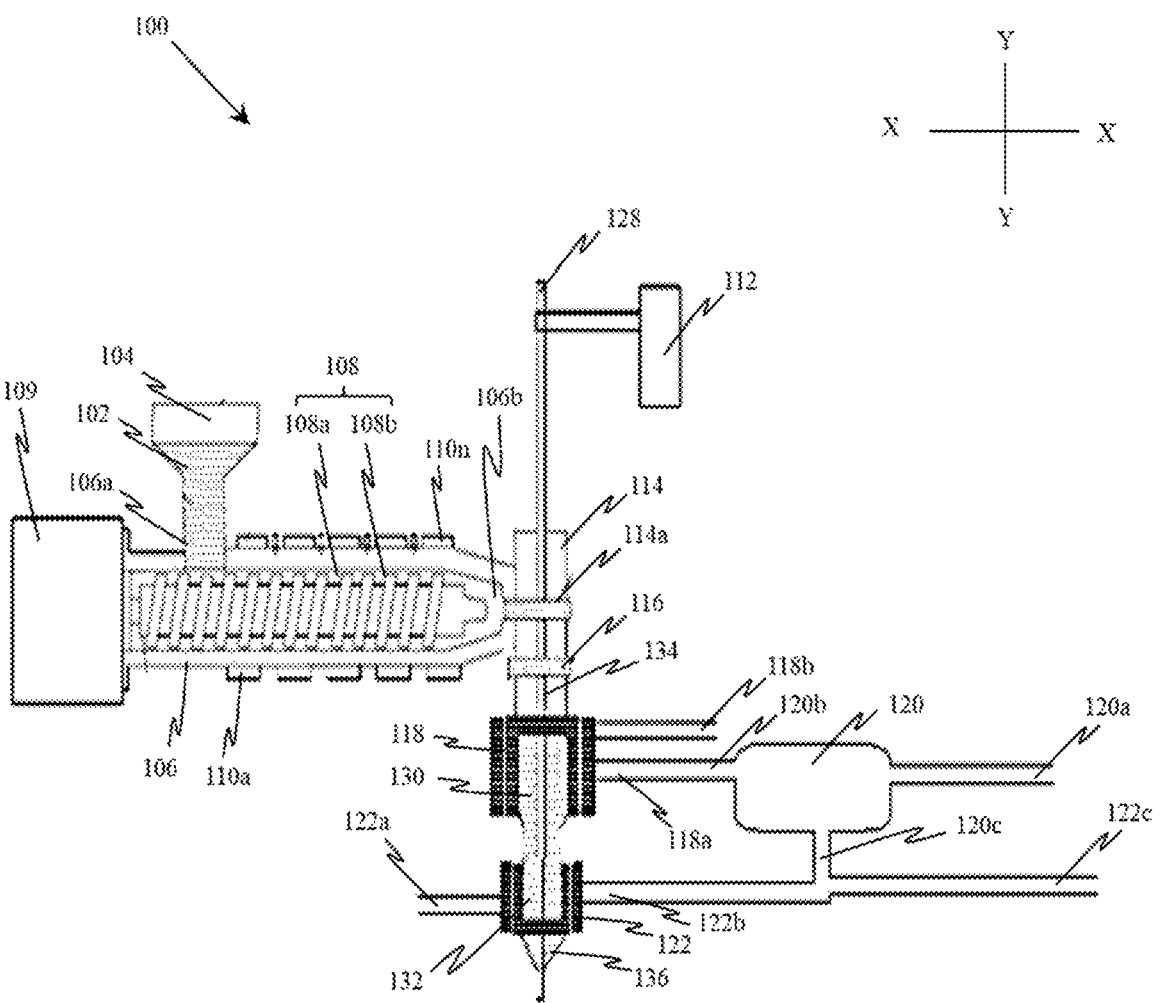
FIG. 1A is a pictorial snapshot illustrating an extrusion apparatus for manufacturing a soot preform in accordance with one embodiment of the present invention.

Extrusion apparatus—100
Optical fiber manufacturing apparatus—101
Silica slurry—102
Feed-hopper—104
Barrel—106
One or more screws—108a, 108b
Plurality of heaters—110a-110n
Core rod holder—112
Die header—114
Iris frame—116
Drying furnace—118
Gas tank—120
Debinding furnace—122
Sinter furnace—124
Draw furnace—126
Core rod—128
Soot preform—130
Dried soot preform—132
Conical portion—134
Green body—136
Glass preform—138
Cooling tube—140
Optical fiber—142
Vertical extrusion apparatus—200
Barrel extension tube—202
First end of the barrel extension tube—202a

Second end of the barrel extension tube—202*b*

Plurality of vanes—302*a*-302*f*

Outside rim—304

Central orifice—306

The optical fiber is illustrated in the accompanying drawings, which like reference letters indicate corresponding parts in the various figures. It should be noted that the accompanying figure is intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE INVENTION

The principles of the present invention and their advantages are best understood by referring to FIG. 1A to FIG. 9. In the following detailed description, numerous specific details are set forth in order to provide a thorough understanding of the embodiment of the invention as illustrative or exemplary embodiments of the invention, specific embodiments in which the invention may be practised are described in sufficient detail to enable those skilled in the art to practice the disclosed embodiments. However, it will be obvious to a person skilled in the art that the embodiments of the invention may be practised with or without these specific details. In other instances, well-known methods, procedures and components have not been described in detail so as not to unnecessarily obscure aspects of the embodiments of the invention.

The following detailed description is, therefore, not to be taken in a limiting sense, and the scope of the present invention is defined by the appended claims and equivalents thereof. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. References within the specification to "one embodiment," "an embodiment," "embodiments," or "one or more embodiments" are intended to indicate that a particular feature, structure, or characteristic described in connection with the embodiment is included in at least one embodiment of the present invention.

Although the terms first, second, etc. may be used herein to describe various elements, these elements should not be limited by these terms. These terms are generally only used to distinguish one element from another and do not denote any order, ranking, quantity, or importance, but rather are used to distinguish one element from another. Further, the terms "a" and "an" herein do not denote a limitation of quantity, but rather denote the presence of at least one of the referenced items.

The conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The following brief definition of terms shall apply throughout the present invention:

Term "optical fiber" is referred to as a light guiding medium that provides high-speed data transmission. The optical fiber comprises one or more glass cores and a glass cladding. The light moving through the one or more glass cores of the optical fiber relies upon the principle of total internal reflection, where the one or more glass core has a higher refractive index than the refractive index of the cladding of the optical fiber.

Term "core" of an optical fiber as used herein is referred to as the one or more cylindrical structure present in the center or in a predefined lattice of the optical fiber, that is configured to guide the light rays inside the optical fiber.

Term "cladding" of an optical fiber as used herein is referred to as one or more layered structure covering the core of an optical fiber from the outside, that is configured to possess a lower refractive index than the refractive index of the core to facilitate total internal reflection of light rays inside the optical fiber.

Term "glass preform" as used herein refers to a solid cylindrical body made up of glass that is melted and drawn to form an optical fiber. The cylindrical glass preform is designed to have the desired refractive index profile for the optical fiber.

Term "draw furnace" as used herein is referred to as a high-temperature chamber used for melting the glass preform and drawing the optical fiber. To start the drawing, the glass preform is lowered into the furnace chamber. Generally, the drawing region is heated to about 1,900° C., where the glass softens and elongates with a teardrop-shaped drip pulling the optical fiber downward.

Term "conical portion" as used herein referred to as a bottom point of the glass preform which is melted for pulling the bare optical fiber form that point.

Term "sintering furnace" as used herein referred to as a chamber used to convert a green body extruded from an extrusion apparatus to a glass preform. The temperature of the sintering furnace is maintained at 1200-1600 degree Celsius. The density of the green body lies in a range of 0.4 gram per cubic-centimeter (g/cc) to 0.9 g/cc and the density of the glass preform lies in a range of 2.19 g/cc to 2.20 g/cc.

Term "double extrusion" as used herein refers to a process that requires difference in radial compositions (inner and outer radial compositions) throughout a preform or a rod. To facilitate double extrusion, an inner region with an inner radial composition is firstly extruded and then dried to form the preform or the rod. The preform or the rod is then used as bait for further extrusion of layers over it.

Term "discharge pressure" as used herein refers to amount of pressure that is exerted by each screw of the one or more screws to push the silica slurry towards the outlet end of the barrel.

Term "channel" as used herein refers to perpendicular distance between two adjacent threads of each screw of the one or more screws.

Term "continuous process" as used herein may refer to non-stop production of a plurality of soot preforms.

Term "multiple layers" as used herein refers to one or more layers that are extruded on the core rod.

FIG. 1A is a pictorial snapshot illustrating an extrusion apparatus 100 for manufacturing a soot preform 130 in accordance with one embodiment of the present invention. In particular, the extrusion apparatus 100 may be a horizontal extrusion apparatus 100. The horizontal extrusion apparatus 100 may manufacture the soot preform 130, from which a glass preform 138 (as shown later in FIG. 1B) is obtained to manufacture an optical fiber 142 (as shown later in FIG. 1B). Moreover, the soot preform 130 may be manufactured from a silica slurry 102 prepared from silica particles. Further, the silica particles may be known as silicon dioxide ($SiO_2$) particles. The silica particles may be mixed with one or more solvents and one or more binders in a container (not shown) and/or one or more additives to prepare the silica slurry 102. The one or more additives may be stabilizers, dispersant, and/or polymerizing initiators.

In accordance with an embodiment of the present invention, the horizontal extrusion apparatus 100 may be adapted to manufacture the soot preform 130 by an extrusion process. The extrusion process may be one but not limited to, direct extrusion and indirect extrusion. In particular, the horizontal extrusion apparatus 100 may have a feed-hopper 104, a barrel 106, one or more screws 108 (i.e., 108a and 108b), a plurality of heaters 110 of which first through nth heaters (here n is an integer) 110a-110n are shown, a core rod holder 112, a die header 114, an iris frame 116, a drying furnace 118, a gas tank 120, and a debinding furnace 122. The barrel 106 of the horizontal extrusion apparatus 100 may be arranged along a X-X direction (i.e., a horizontal direction) of a direction index as shown in FIG. 1A.

In accordance with an embodiment of the present invention, the feed-hopper 104 is adapted to feed the silica slurry 102 to the barrel 106 and hold the silica slurry 102. In particular, the silica slurry 102 may be fed into the barrel 106 under the action of gravity fall from the feed-hopper 104 under the effect of gravity. In some aspects of the present disclosure, the feed-hopper 104 may have but not limited to a conical shape.

The barrel 106 is disposed beneath the feed-hopper 104 and have an inlet end 106a and an outlet end 106b. In particular, the inlet end 106a is disposed beneath the feed-hopper 104 such that the barrel 106 receives the silica slurry from the feed-hopper 104. Moreover, the one or more screws 108a and 108b may be disposed within the barrel 106. The one or more screws 108a and 108b are adapted to rotate within the barrel 106. Further, the one or more screws 108a and 108b are adapted to rotate within the barrel 106 by way of a motor 109.

Furthermore, the one or more screws 108a and 108b, upon rotation, may be further adapted to properly mix the one or more solvents and the one or more binders in the silica slurry 102. The one or more screws 108a and 108b, upon rotation may be adapted to provide thrust to the silica slurry 102 may push the silica slurry 102 towards the die header 114. Upon rotation, one or more screws 108a and 108b, may push the silica slurry 102 towards the outlet end 106b such that the silica slurry 102 ejects out from the barrel 106. The one or more screws 108a and 108b may force the silica slurry 102 to shear against walls of the barrel 106 thereby developing heat due to viscous dissipation. Aspects of the present disclosure are intended to include and/or otherwise cover any number of screws without deviating from the scope of the present disclosure.

In some aspects of the present disclosure, each screw of the one or more screws 108a and 108b may be a helical screw and can be moved in one of, a clockwise direction and a counter-clockwise direction. In some exemplary aspects of the present disclosure, each screw of the one or more screws 108a and 108b may rotate according to right-hand cork screw rule, the one or more screws 108a and 108b may push the silica slurry 102 towards the outlet end 106b of the barrel 106.

In alternate embodiments of the present invention, the one or more screws may be a pair of screws i.e., 108a and 108b that facilitate proper mixing of the silica slurry 102 and may leave lesser number of dead spaces present in the silica slurry 102.

In some aspects of the present disclosure, expression for discharge pressure associated to each screw of the one or more screws may be $$P = \frac{\pi D H^3 p \, (\sin \Theta)^2}{(12 L \mu)}$$

or $$P = \frac{0.02163 \, D H^3 p}{(L \mu)}$$

where:—

P is pressure flow

D is diameter of each screw of the one or more screws 108a and 108b;

H is depth of a channel of each screw of the one or more screws 108a and 108b;

p is discharging pressure;

L is length of metering section of each screw of the one or more screws 108a and 108b;

$\mu$ is coefficient of viscosity; and $\Theta$ is angle of helix of each screw of the one or more screws 108a and 108b.

The first through nth heaters 110a-110n are disposed at a periphery of the barrel 106. In particular, the first through nth heaters 110a-110n may be adapted to provide heat to the silica slurry 102 that may be present in the barrel 106. Moreover, the first through nth heaters 110a-110n may initiate polymerization of the silica slurry 102 that facilitates the one or more binders to provide ample flexibility to soot structure of the silica slurry 102. Further, the polymerization of the silica slurry 102 may provide ample flexibility and prevent packing of the soot structure. Furthermore, the first through nth heaters 110a-110n may prevent too much packing of the soot structure, which may allow a gas, if any, to vent out from the soot structure and thereby eliminating cracks in the soot preform 130 (i.e., a clad soot). The first through nth heaters 110a-110n may provide a temperature that may lie in a range between 700 to 800 degrees Celsius to facilitate efficient polymerization of the silica slurry 102.

In accordance with an embodiment of the present invention, the die header 114 may be coupled to the barrel 106. The die header 114 have a core rod holder 114a, a core rod 128 that is inserted into the die header 114 from the top of the die header 114 to push the core rod 128. Further, the core rod 128 may be held in the core rod holder 114a. Or, the core rod 128 may be placed at a center of the die header 114.

In particular, the core rod 128 may form back-bone/supporting structure of the soot preform 130. The core rod holder may be adapted to feed the core rod 128 in the die header 114 and to move the core rod 128 towards the iris frame 116. The die header 114 may be adapted to receive the silica slurry 102 from the outlet end 106b of the barrel 106. Moreover, the silica slurry 102 may be cladded on an outer surface of the core rod 128 to form the soot preform 130. Further, the die header 114 may be designed such that the die header 114 co-extrudes the core rod 128 synchronize with the speed of extrusion of the clad soot. The synchronization in the speed of feeding the core rod 128 and the speed of extrusion of the clad soot eliminates stresses in the optical fiber 142 and may ensure proper cladding of the clad soot materials over the core rod 128.

The iris frame 116 may be disposed underneath the die header 114 and adapted to form a conical portion 134 at an end of the soot preform 130. Particularly, the iris frame 116 may be adapted to form the conical portion 134 having a desired length and a slope at the end of the soot preform 130. Moreover, the iris frame 116 may be adapted to form the conical portion 134 at the bottom end of the soot preform 130.

The drying furnace 118 may be disposed beneath the iris frame 116, a first inlet 118*a* and a first outlet 118*b*. In particular, the drying furnace 118 may be adapted to eliminate moisture that is present in the soot preform 130 to produce a dried soot preform 132.

The gas tank 120 118 may be coupled to the gas tank 120 and have a second inlet 120*a*, a second outlet 120*b*, and a vent 120*c*. The first inlet 118*a* of the drying furnace 118 may be coupled to the second outlet 120*b* of the gas tank 120. The second inlet 120*a* may be adapted to allow air to enter into the gas tank 120. In some examples, the second inlet 120*a* may be adapted to allow the air having temperature of about 25° Celsius. The gas tank 120 may be adapted to mix the air with a gas to produce a hot gas. The second outlet 120*b* may be adapted to exit the hot gas. In some examples, the hot gas may have a temperature of about 60° Celsius. The first inlet 118*a* may therefore, facilitate the hot gas to enter to the drying furnace 118. The hot gas may come in contact with the soot preform 130 such that the heat provided by the hot gas eliminates the moisture from the soot preform 130 in the drying furnace 118.

In accordance with an embodiment of the present invention, the debinding furnace 122 may be coupled to the drying furnace 118 and have a third inlet 122*a* and a third outlet 122*b*. In particular, the third inlet 122*a* may be adapted to allow air to enter into the debinding furnace 122 and the third outlet 122*b* may be coupled to the vent 120*c*. Moreover, the gas tank 120 may have a fourth outlet 122*c* coupled to the vent 120*c* to purge out debinded gases.

In accordance with an embodiment of the present invention, the debinding furnace 122 may be adapted to eliminate the one or more stabilized binders from the dried soot preform 132. Further the debinding furnace 122 is adapted to eliminate majority of chemisorbed OH molecules (i.e., chemisorbed moisture) from the dried soot preform 132. Further, the soot preform 130 or the dried soot preform 132 may be treated for about 1 to 3 hours in the debinding furnace 122 at a temperature range of about 800 Celsius to 1200° Celsius. The de-binding furnace 122 may be, upon removal of the one or more binders, adapted to produce a green body 136.

In some aspects of the present disclosure, the soot preform 130 may be manufactured in semi-continuous batch process (hereinafter referred to as "batch process"). The batch process may require manufacturing of the soot preform 130 such that the soot preform 130 may be removed from the horizontal extrusion apparatus 100. The soot preform 130 may then undergo drying by way of the drying furnace 118 and debinding by way of the debinding furnace 122 in order to manufacture the glass preform 138 and then optical fiber 142.

Figure 1B:
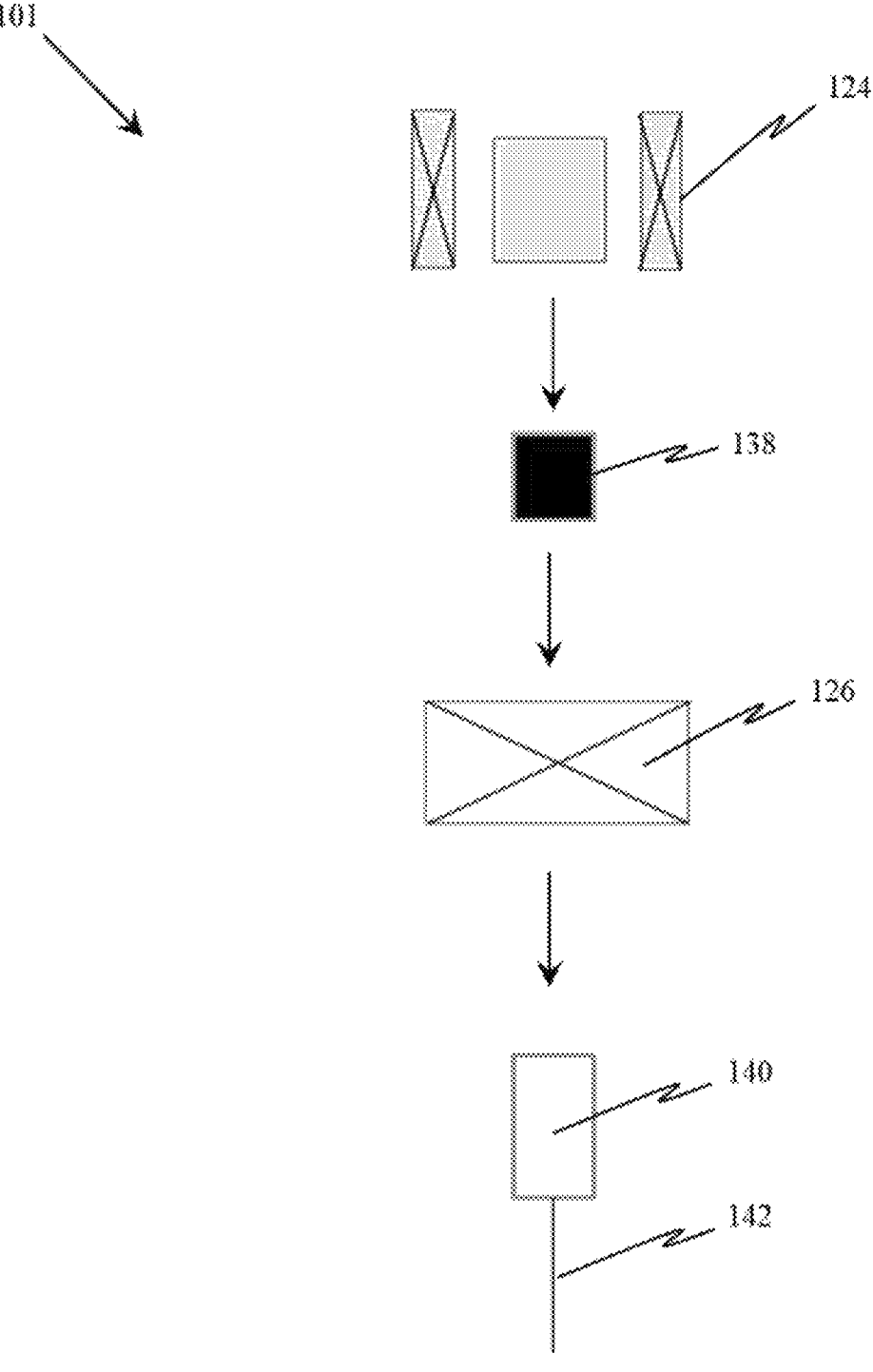
FIG. 1B is a pictorial snapshot illustrating an optical fiber manufacturing apparatus in accordance with another embodiment of the present invention.

FIG. 1B is a pictorial snapshot illustrating an optical fiber manufacturing apparatus in accordance with another embodiment of the present invention. The optical fiber manufacturing apparatus 101 may have a sinter furnace 124, a draw furnace 126, and a cooling tube 140 and may be adapted to manufacture the optical fiber 142. In particular, the dried soot preform 132 or the green body 136 may be transferred to the sinter furnace 124 for manufacturing the optical fiber 142.

Moreover, the dried soot preform or the green body 136 may be transferred to the sinter furnace 124 adapted to sinter the dried soot preform or the green body 136 to obtain the glass preform 138. While sintering, the sinter furnace 124 may be adapted to close pores in the soot preform 130. Further, the glass preform 138 may be transferred to the draw furnace 126 which is adapted to draw the optical fiber 142. In particular, to draw the optical fiber 142 from the glass preform 138, the conical portion 134 of the glass preform 138 may be softened in presence of one or more gases. Furthermore, the conical portion 134 of the glass preform 138 may be melted at high temperature (generally between 1800° C. to 2200° C.) to draw the optical fiber 142.

In accordance with an embodiment of the present invention, the glass preform 138 may be doped with one or more suitable dopants to manufacture the optical fiber 142. In particular, a bare optical fiber may be drawn out from the glass preform 138 in the draw furnace 126. The bare optical fiber may be defined as a type of optical fiber without coating. The bare optical fiber may be gradually cooled in one or more stages in an annealing furnace (not shown). The annealing furnace may be adapted to cool the bare optical fiber (for example the temperature of the bare optical fiber may be lowered down to 450° C.). Further, the bare optical fiber may be cooled in a cooling tube 140 that may be positioned below the annealing furnace. The cooling tube 140 may use one or more cooling gases to cool down the bare optical fiber. The one or more cooling gases may be adapted to bring the temperature of the bare optical fiber to 50C.

In accordance with an embodiment of the present invention, the cooling tube 140 may be coupled to the draw furnace 126. In particular, the cooling tube 140 may be disposed below the draw furnace 126 and may be adapted to cool the optical fiber 142, while the optical fiber 142 is drawn from the draw furnace 126. Specifically, one or more coolants may flow through the cooling tube 140 such that the one or more coolants cools the optical fiber 142.

Figure 1C:
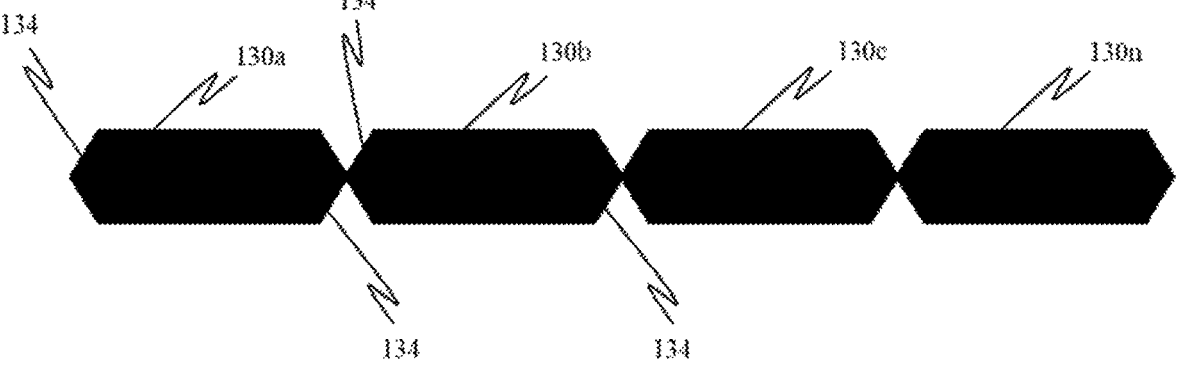
FIG. 1C illustrates a representation of manufacturing of a plurality of soot preforms in a continuous process in accordance with an embodiment of the present invention.

FIG. 1C illustrates a representation of manufacturing of a plurality of soot preforms in a continuous process in accordance with an embodiment of the present invention. In particular, the plurality of soot preforms 130*a*-130*n* is manufactured in the continuous process, by way of the horizontal extrusion apparatus 100. Moreover, the plurality of soot preforms 130*a*-130*n* may be manufactured in the continuous process by the one the horizontal extrusion apparatus 100 and the vertical extrusion apparatus 200. In the continuous process, while manufacturing of a first soot preform 130*a* of the plurality of soot preforms 130*a*-130*n*, the iris frame 116 may close. The iris frame 116, upon manufacturing of a second soot preform 130*b* of the plurality of soot preforms 130*a*-130*n*, may gradually open. The plurality of soot preforms 130*a*-130*n* may be removed from the horizontal extrusion apparatus 100 may undergo drying by way of the drying furnace 118. Further, the plurality of soot preforms 130*a*-130*n*, upon drying, may undergo debinding by way of the debinding furnace 122 in order to manufacture the green body 136. During manufacturing of the first soot preform 130*a* of the plurality of soot preforms 130*a*-130*n*, the iris frame 116 may form the conical portion 134 at a left end of the first soot preform 130*a*.

To form the conical portion 134 at the left end of the first soot preform 130*a*, the iris frame 116 may gradually open. In particular, the iris frame 116 may be adapted to form the conical portion 134 at a right end of the first soot preform 130*a*. To form the conical portion 134 at the right end of the first soot preform 130*a*, the iris frame 116 may gradually close. Moreover, the iris frame 116 may be adapted to form the conical portion 134 at a left end of the second soot preform 130*b* of the plurality of soot preforms 130*a*-130*n*. Further, to form the conical portion 134 at the left end of the second soot preform 130*b*, the iris frame 116 may gradually open. In this way, the iris frame 116 may gradually close and open in order to form the conical portion 134 at a left and a right end of each soot preform of the plurality of soot preforms 130*a*-130*n*.

Figure 2A:
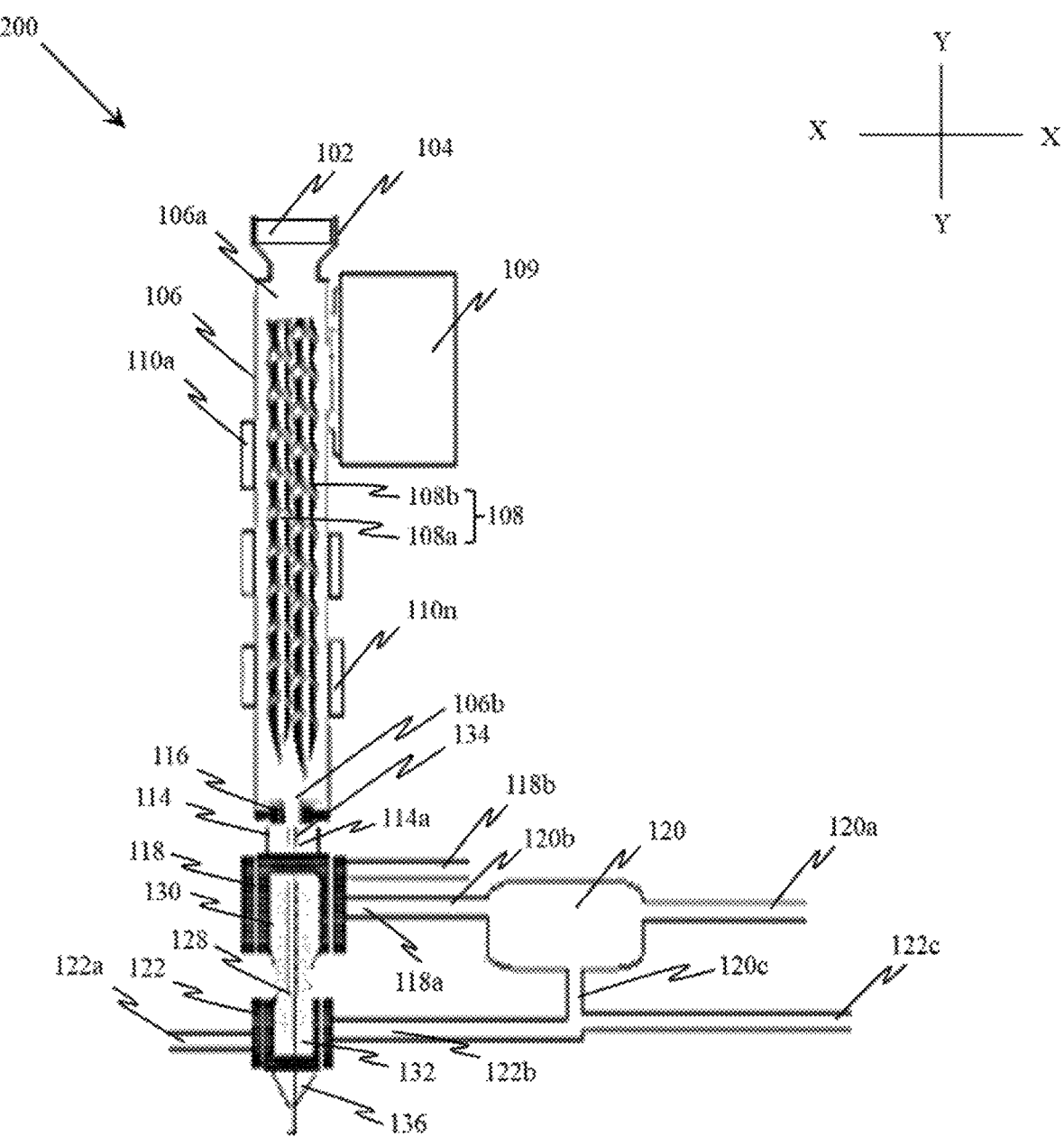
FIG. 2A is a pictorial snapshot illustrating a side view of the extrusion apparatus for manufacturing a soot preform in accordance with an embodiment of the present invention.

FIG. 2A is a pictorial snapshot illustrating a side view of the extrusion apparatus for manufacturing a soot preform in accordance with an embodiment of the present invention. The extrusion apparatus 200 may be a vertical extrusion apparatus 200. In particular, the extrusion apparatus 200 may be a vertical extrusion apparatus 200 which manufacture the soot preform 130 from which the glass preform 138 is obtained to manufacture the optical fiber 142. The soot preform 130 may be manufactured from a silica slurry 102 that may be prepared from silica particles. Moreover, the silica particles may be known as silicon dioxide (SiO$_2$) particles. The silica particles may be mixed with one or more solvents, one or more binders, and one or more additives in a container (not shown). The silica particles may be mixed with the one or more solvents and one or more binders to prepare the silica slurry 102.

The vertical extrusion apparatus 200 may have the feed-hopper 104, the barrel 106, the one or more screws 108 of which first and second screws 108*a*-108*b* are shown, the plurality of heaters 110 of which first through nth heaters (here n is an integer) 110*a*-110*n* are shown, the die header 114, the iris frame 116, the drying furnace 118, the gas tank 120, the debinding furnace 122. The barrel 106 of the vertical extrusion apparatus 200 may be arranged along a Y-Y direction (i.e., a vertical direction) of a direction index.

The feed-hopper 104 may be adapted to hold the silica slurry 102 to the barrel 106. In particular, the silica slurry 102 may be fed into the barrel 106 under the action of gravity. Moreover, the silica slurry 102 may fall from the feed-hopper 104 under the effect of system external forces (i.e., natural gravity or vibrations or pressure from backward systems). Further, the feed-hopper 104 may have a conical shape.

The barrel 106 may have the inlet end 106*a* and the outlet end 106*b* may be disposed beneath the feed-hopper 104. In particular, the inlet end 106*a* may be disposed beneath the feed-hopper 104 such that the barrel 106 receives the silica slurry from the feed-hopper 104. The one or more screws 108*a* and 108*b* may be disposed within the barrel 106 adapted to rotate within the barrel 106 by way of a motor 109. Further, one or more screws 108*a* and 108*b*, upon rotation, adapted to properly mix the one or more solvents and the one or more binders in the silica slurry 102. Furthermore, the one or more screws 108*a* and 108*b*, upon rotation may be adapted to provide thrust to the silica slurry 102 that may push the silica slurry 102 towards the die header 114.

In accordance with an embodiment of the present, the one or more screws 108*a* and 108*b*, upon rotation, may push the silica slurry 102 towards the outlet end 106*b* such that the silica slurry 102 ejects out from the barrel 106. Furthermore, the one or more screws 108*a* and 108*b* may force the silica slurry 102 to shear against walls of the barrel 106 thereby developing heat due to viscous dissipation.

Each screw of the one or more screws 108*a* and 108*b* may be the helical screw moved in one of, the clockwise direction and the counter-clockwise direction. In some exemplary aspects of the present disclosure, each screw of the one or more screws 108*a* and 108*b* may rotate in the clockwise direction and according to right-hand cork screw rule, the one or more screws 108*a* and 108*b* may push the silica slurry 102 towards the outlet end 106*b* of the barrel 106.

In some exemplary aspects of the present disclosure, the one or more screws may be the pair of screws i.e., 108*a* and 108*b* to facilitate proper mixing of the silica slurry 102 and may leave lesser number of dead spaces present in the silica slurry 102. The residence time of the silica slurry 102 in the vertical extrusion apparatus 200 may be lesser as compared to the horizontal extrusion apparatus 100, therefore, the pair of screws are advantageous for the vertical extrusion apparatus 200.

In some aspects of the present disclosure, expression for discharge pressure associated to each screw of the one or more screws may be $$P = \frac{\pi D H^3 p (\sin \Theta)^2}{(12L\mu)}$$

Or, $$P = \frac{0.02163 \, D H^3 p}{(L\mu)}$$

where:—
P is pressure flow
D is diameter of each screw of the one or more screws 108*a* and 108*b*;
H is depth of a channel of each screw of the one or more screws 108*a* and 108*b*;
p is discharge pressure;
L is length of metering section of each screw of the one or more screws 108*a* and 108*b*;
μ is coefficient of viscosity; and
Θ is angle of helix of each screw of the one or more screws 108*a* and 108*b*.

The first through nth heaters 110*a*-110*n* may be disposed at the periphery of the barrel 106. The first through nth heaters 110*a*-110*n* may be adapted to provide heat to the silica slurry 102 that may be present in the barrel 106 and initiate polymerization of the silica slurry 102 that facilitates the one or more binders to provide ample flexibility to soot structure of the silica slurry 102. Moreover, the first through nth heaters 110*a*-110*n* may prevent too much packing of the soot structure, which may allow the gas, if any, to vent out from the soot structure and thereby eliminating cracks in the soot preform 130 (i.e., a clad soot). Further, the first through nth heaters 110*a*-110*n* may provide the sufficient temperature (for example, that may lie in a range of 700 to 800 degrees Celsius) to facilitate efficient polymerization or reconstruction of the silica slurry 102 based on the one or more binders along with the other additives.

The die header 114 may be coupled to the barrel 106 and have a core rod holder 114*a*. The core rod 128 may be inserted into the die header 114 through the bottom of die header 114. The core rod 128 may be held in the core rod holder 114*a* and may be adapted to push the core rod 128. The core rod 128 may be placed at a center of the die header 114. The core rod 128 may form back-bone/supporting structure of the soot preform 130. The die header 114 may further be adapted to receive the silica slurry 102 from the outlet end 106*b* of the barrel 106. In particular, the silica slurry 102 may be cladded on the core rod 128 to form the soot preform 130. The die header 114 may be designed such that the die header 114 co-extrudes the core rod 128. The speed of feeding the core rod 128 may synchronize with the speed of extrusion of the clad soot. The synchronization in the speed of feeding the core rod 128 and the speed of extrusion of the clad soot eliminates stresses in the optical fiber 142 and ensures proper adherence of the clad soot over the core rod 128.

The iris frame 116 may be disposed underneath the die header 114. The iris frame 116 may not be aligned on a same axis as of the barrel 106. In particular, the iris frame 116 may be disposed or aligned offset from the axis of the barrel 106 (as can be clearly seen through FIG. 2C). The iris frame 116 may be adapted to form the conical portion 134 at the end of the soot preform 130. The conical portion 134 may prevent splitting of the soot preform 130. Moreover, the iris frame 116 may be adapted to form the conical portion 134 having the desired length and the slope at the end of the soot preform 130. For example, the iris frame 116 may be adapted to form the conical portion 134 at the bottom end of the soot preform 130.

The drying furnace 118 may be disposed beneath the iris frame 116. The drying furnace 118 may have the first inlet 118*a* and the first outlet 118*b* an may be adapted to eliminate moisture that is present in the soot preform 130 to produce the dried soot preform 132.

The gas tank 120 may have the second inlet 120*a*, the second outlet 120*b*, and the vent 120*c*. The drying furnace 118 may be coupled to the gas tank 120. In particular, the first inlet 118*a* of the drying furnace 118 may be coupled to the second outlet 120*b* of the gas tank 120 and the second inlet 120*a* may be adapted to allow air to enter into the gas tank 120.

In some examples, the second inlet 120*a* may be adapted to allow the air having temperature of about 25° Celsius. The gas tank 120 may be adapted to mix the air with the incoming gas from de-binding furnace through 120*c* gas to produce the hot gas required for drying. The second outlet 120*b* may be adapted to exit the hot gas. In some examples, the hot gas may have a temperature range of about 60-100° Celsius. The first inlet 118*a* may therefore, facilitate the hot gas to enter to the drying furnace 118. The hot gas may come in contact with the soot preform 130 such that the heat provided by the hot gas eliminates the moisture from the soot preform 130 in the drying furnace 118.

The debinding furnace 122 may be coupled to the drying furnace 118. The debinding furnace 122 may have the third inlet 122*a* and the third outlet 122*b*. The third outlet 122*b* may be coupled to the vent 120*c*. The third inlet 122*a* may be adapted to allow air to enter into the debinding furnace 122. The debinding furnace 122 may be adapted to eliminate the one or more binders along with the one or more additives from the soot preform 130. The debinding furnace 122 may further be adapted to eliminate chemisorbed OH molecules (i.e., chemisorbed moisture) from the soot preform 130. Specifically, the soot preform 130 may be treated for about 1 to 3 hours in the debinding furnace 122 at the temperature range of about 800 Celsius to 1200° Celsius. The gas tank 120 may have a fourth outlet 122*c*. The fourth outlet 122*c* may be coupled to the vent 120*c* to purge out the debinded gases. The debinding furnace 122 may be, upon removal of the one or more binders and the one or more additives, adapted to produce the green body 136. The green body 136 may be transferred to the optical fiber manufacturing apparatus 101 to manufacture the optical fiber 142 (as explained hereinabove in context to FIG. 1A).

In some aspects of the present disclosure, the drying furnace 118 and the debinding furnace 122 may not form the part of the horizontal extrusion apparatus 100 and the vertical extrusion apparatus 200. In such a scenario, the soot preform 130 may be obtained from the horizontal and vertical extrusion apparatuses 100 and 200 such that the soot preform 130 is then transferred to the drying furnace 118. Further, the drying furnace 118 may be adapted to eliminate moisture from the soot preform and the debinding furnace 122 may be adapted to eliminate the one or more binders and the one or more additives from the soot preform 130 to produce the green body 136.

In some aspects of the present disclosure, the soot preform 130 may be manufactured in semi-continuous batch process (hereinafter referred to as "batch process"). The batch process may require manufacturing of the soot preform 130 such that the soot preform 130 may be removed from the vertical extrusion apparatus 200.

In some preferred aspects of the present disclosure, to manufacture the optical fiber 142, the horizontal extrusion apparatus 100 may be preferred over the vertical extrusion apparatus 200.

In some aspects of the present disclosure, 70% of total amount of the silica particles may have a size of about 16 microns and remaining amount of silica particles of the total amount of the silica particles may have a size that may be smaller than 16 microns.

In some aspects of the present disclosure, the one or more solvents may be organic solvents. In some other aspects of the present disclosure, the one or more solvents may be inorganic solvents. In some other aspects of the present disclosure, the one or more solvents may be water-based solvents. In some other aspects of the present disclosure, the one or more solvents may be alcohol-based solvents. In some other aspects of the present disclosure, the one or more solvents may be ketone-based solvents. In some other aspects of the present disclosure, the one or more solvents may have a quantity that may lie in a range of about 10% to 30% with respect to the amount of silica particles.

In some aspects of the present disclosure, the one or more binders and the one or more additives may be organic binders. In some other aspects of the present disclosure, the one or more binders and the one or more additives may be added in a range of about 0.1% to 5% with respect to amount of the silica particles. In some other aspects of the present disclosure, the one or more binders may include but not limited to, polypropylene carbonate, polyvinyl alcohol, polystyrene, camphor, gelatin-based agar, and may include other stabilizing agents like the dispersant, polymerizing initiator, plasticizer and the like. Aspects of the present disclosure are intended to include and/or otherwise cover any kind of known and later developed stabilized binder. In some other aspects of the present disclosure, the one or more binders may be monomers in order to form a cage-like structure of the silica slurry 102. In some other aspects of the present disclosure, the polymeric units (such as hydrocolloids) may undergo new cage like structure using hydrogen bonds. The cage-like structure of the silica slurry 102 may facilitate to adhere the silica particles into soot such that the one or more binders may bind the silica particles to provide the soot preform 130 of desired shape and size.

In some aspects of the present disclosure, the silica slurry 102 may be a combination of the one or more solvents, silica particles, and the one or more binders.

In some exemplary aspects of the present disclosure, loading of silica particles in the silica slurry 102 may lie in a range from about 40% to 80%. The one or more binders may be agar gel may lie in a range from about 1% to 3%. The remaining amount of the silica slurry 102 may be water (i.e., solvent). The amount of solvent may lie in a range of 17% to 59%.

In some aspects of the present disclosure, the drying furnace 118 may be provided with a heating element (not shown) that raises temperature of the gas such that the gas eliminates the moisture present in the soot preform 130.

In some aspects of the present disclosure, one or more dispersants may be added in the silica slurry 102 to stabilize the silica slurry 102.

In some aspects of the present disclosure, the iris frame 116 may be used to extrude pure silica core rods (i.e., by double extrusion) and a core preform (i.e., by double extrusion).

FIG. 2B is a pictorial snapshot illustrating a front view of the extrusion apparatus of FIG. 2A for manufacturing the soot preform in accordance with an embodiment of the present invention. The vertical extrusion apparatus 200 may further have a barrel extension tube 202 that have a first end 202*a* and a second end 202*b*. In particular, the first end 202*a* of the extension tube 202 may be coupled to the outlet end 106*b* of the barrel 106 and the second end 202*b* of the extension tube 202 may be coupled to the die header 114. Moreover, the barrel extension tube 202 may be adapted to allow passage of the silica slurry 102 from the barrel 106 to the die header 114. Further, the silica slurry 102 may be pushed from the outlet end 106*b* to the first end 202*a* such that the silica slurry 102 enters the barrel extension tube 202 from the first end 202*a*. Additionally, the silica slurry 102 is pushed within the barrel extension tube 202. And, the silica slurry 102 may reach up to the second end 202*b* such that the silica slurry 102 enters the die header 114 from the second end 202*b*. As the die header 114 and the iris frame 116 is disposed or aligned offset from the axis of the barrel 106, the core rod 128 may be continuously pushed down using the core rod holder 112 which ensures continuous manufacturing of the soot preform 130.

FIG. 3 is a pictorial snapshot illustrating an iris frame of the extrusion apparatus in accordance with an embodiment of the present invention. The iris frame 116 may include a plurality of vanes 302 of which first through sixth vanes 302*a*-302*f* are shown, an outside rim 304 and may be coupled to a microcontroller (not shown). The microcontroller may be a programmable logic controller (PLC). Each vane of the first through sixth vanes 302*a*-302*f* may be adapted to move in a radial direction of the iris frame 116. In particular, the movement of each vane of the first through sixth vanes 302*a*-302*f* may be controlled by the microcontroller. Upon movement of each vane of the first through sixth vanes 302*a*-302*f*, a central orifice 306 may be created such that the central orifice 306 may become narrower or wider. Moreover, each vane of the first through sixth vanes 302*a*-302*f* may extend such that upon extension, the central orifice 306 may become narrower, i.e., a diameter of the central orifice 306 may be reduced. Each vane of the first through sixth vanes 302*a*-302*f* may retract such that upon retraction, the central orifice 306 may become wider, i.e., the diameter of the central orifice 306 may be increased. Therefore, upon movement of each vane of the first through sixth vanes 302*a*-302*f*, the iris frame 116 may be adapted to control or adjust the diameter of the central orifice 306 in order to control or adjust the diameter of the soot preform 130.

Upon retraction, each vane of the first through sixth vanes 302*a*-302*f* may slide into the outside rim 304 such that a portion of each vane of the first through sixth vanes 302*a*-302*f* is accommodated in the outside rim 304. The iris frame 116 may be adapted to form the conical portion 134 at the end of the soot preform 130. The variation in the diameter of the central orifice 306 may facilitate the iris frame 116 to adjust or vary dimensions of the conical portion 134 i.e., to form the conical portion 134 of the desired length and the slope at the beginning and end of the soot preform 130. Moreover, the variation in the diameter of the central orifice 306 may facilitate the iris frame 116 to control dimensions of the soot preform 130.

In order to control dimensions of the soot preform 130 and the conical portion 134, a user may set required values of dimensions of the soot preform 130 and the conical portion 134 such that microcontroller actuates an iris motor (not shown). Upon actuation, the iris motor may be adapted to, based on the required values of dimensions set by the user, control variation in the diameter of the central orifice 306 that may further control the dimensions of the soot preform 130 and the conical portion 134. For example, the iris frame 116 may be adapted to continuously vary the diameter of the soot preform 130 that may lie in range of 35 mm to 350 mm with a deviation of ±1 mm.

In some aspects of the present disclosure, each vane of the first through sixth vanes 302*a*-302*f* may be made up of metal. Alternatively, each vane of the first through sixth vanes 302*a*-302*f* may have smooth surface finish. The smooth surface finish of each vane of the first through sixth vanes 302*a*-302*f* may eliminate any irregularity in the surface of the soot preform 130.

Figure 4:
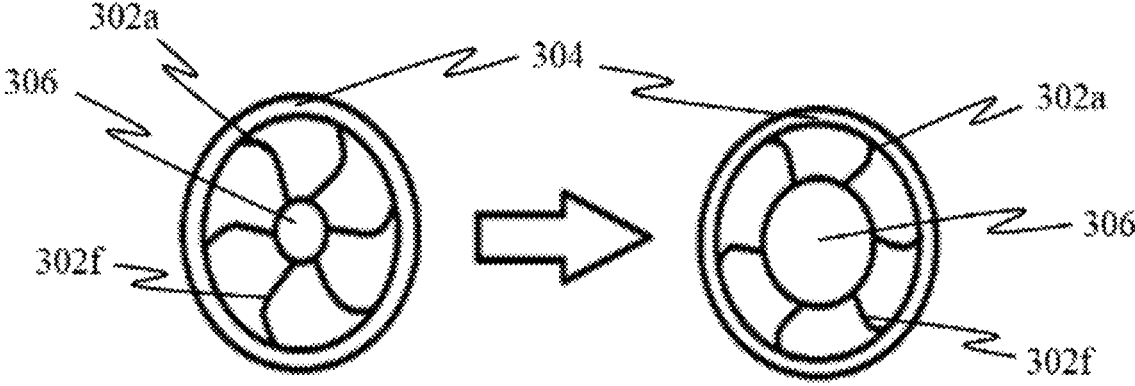
FIG. 4 is a snapshot illustrating working of the iris frame in accordance with an embodiment of the present invention.

FIG. 4 is a snapshot illustrating working of the iris frame in accordance with an embodiment of the present invention. In particular, the diameter of the central orifice 306 of the iris frame 116 may be increased from an initial diameter (that allows insertion of the core rod 128) to a final diameter (i.e., diameter of the soot preform 130, which is an outer diameter of the clad soot).

Figure 5:
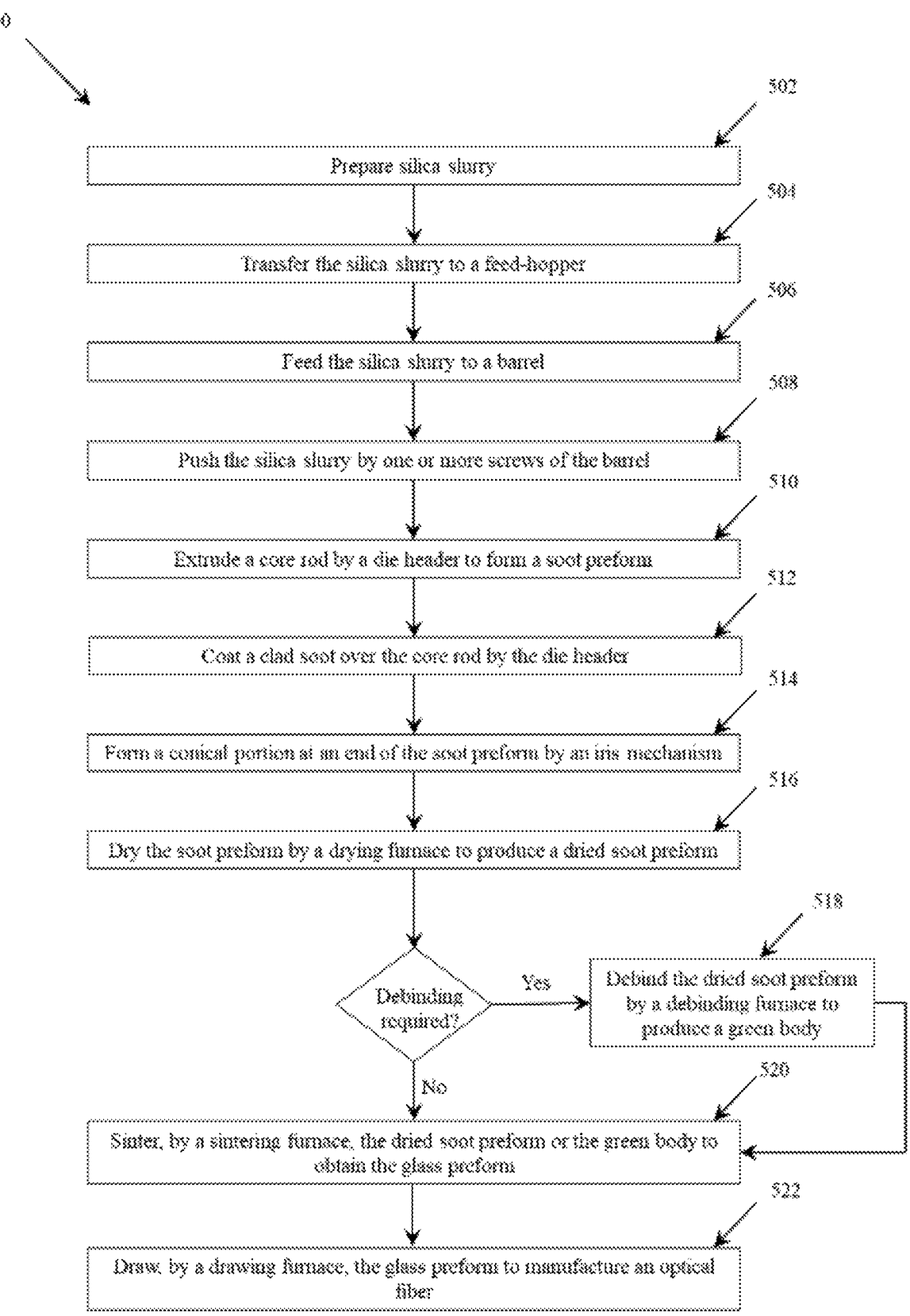
FIG. 5 is a flowchart illustrating a method for manufacturing an optical fiber in accordance with an embodiment of the present invention.

FIG. 5 is a flowchart illustrating a method for manufacturing an optical fiber in accordance with an embodiment of the present invention. The method 500 for manufacturing the soot preform 130 by the one of, the horizontal extrusion apparatus 100 and the vertical extrusion apparatus 200 (hereinafter collectively referred to and designated as "the extrusion apparatus 100 and 200") and then manufacturing the optical fiber 142. The method 500 may employ following steps to manufacture the optical fiber 142.

At step 502, silica slurry 102 may be prepared. In particular, the silica particles may be mixed with the one or more solvents, the one or more binders, and the one or more additives in the container (not shown) to prepare the silica slurry 102. The extrusion apparatus 100 and 200 may convert the silica slurry 102 into a semi-solid silica slurry.

In some aspects of the present disclosure, 70% of silica particles from total amount of the silica particles may have dimension greater than 16 microns and 30% of silica particles from total amount of the silica particles may have dimension smaller than 16 microns.

The one or more solvents may be organic solvents or inorganic solvents or water-based solvents or alcohol-based solvents or ketone-based solvents. In some other aspects of the present disclosure, the one or more solvents may have a quantity that may lie in a range of about 10% to 30% with respect to the amount of silica particles.

In some aspects of the present disclosure, the one or more binders may be added in a range of about 0.1% to 5% with respect to amount of the silica particles. The one or more binders may be organic binders and may include but not limited to, polypropylene carbonate, polyvinyl alcohol, polystyrene, camphor, gelatin-based agar, and may include other stabilizing agents like the dispersant, polymerizing initiator, plasticizer, and the like In some other aspects of the present disclosure, the polymeric units may undergo new cage like structure using hydrogen bonds. The cage-like structure of the silica slurry 102 may facilitate to adhere the silica particles into soot such that the one or more binders may bind the silica particles to provide the soot preform 130 of desired shape and size.

In some aspects of the present disclosure, the silica slurry 102 may have silica particles that may lie in a range of 40% to 80%, the one or more binders that may lie in range of 1% to 3%, and the one or more solvents that may lie in range of 17% to 59%.

At step 504, the silica slurry 102 may be transferred to the feed-hopper 104.

At step 506, the silica slurry 102 is fed from the feed-hopper 104 to the barrel 106. In particular, the silica slurry 102 may be fed to the inlet end 106a of the barrel 106 under the action of gravity and fall from the feed-hopper 104 under the effect of system external forces (i.e., natural gravity or vibrations or pressure from backward systems)

At step 508, the extrusion apparatus 100 and 200 pushes the silica slurry 102 by way of the barrel 106. Particularly, the silica slurry 102 may be pushed by way of the one or more screws 108a and 108b that may be disposed within the barrel 106. The one or more screws 108a and 108b may be adapted to rotate within the barrel 106 to push the silica slurry 102 from the inlet end 106a towards the outlet end 106b of the barrel 106. From the outlet end 106b of the barrel 106, the silica slurry 102 may be pushed towards the die header 114, upon rotation of the one or more screws 108a and 108b.

In some aspects of the present disclosure, the extrusion apparatus 100 and 200 are adapted to mix the silica slurry 102 by way of the one or more screws 108a and 108b. Further, the extrusion apparatus 100 and 200 may be adapted to convert the silica slurry 102 into a semi-solid silica slurry.

At step 510, the extrusion apparatus 100 and 200 may extrude the core rod 128 by way of the die header 114 to receive the silica slurry 102 from the outlet end 106b of the barrel 106. Specifically, the silica slurry 102 may be cladded on the core rod 128 to form the soot preform 130.

At step 512, the extrusion apparatus 100 and 200, by way of the die header 114, may coat the clad soot over the core rod 128. In particular, the die header 114 is designed such that the die header 114 co-extrudes the core rod 128 to obtain the soot preform 130. Moreover, the speed of feeding the core rod 128 may synchronize with the speed of extrusion of the clad soot. Further, the synchronization in the speed of feeding the core rod 128 and the speed of extrusion of the clad soot eliminates stresses in the soot preform 130 and ensures proper cladding of the soot over the core rod 128.

At step 514, the extrusion apparatus 100 and 200, form the conical portion 134 by way of the iris frame 116 at the end of the soot preform 130. In particular, the iris frame 116 may be adapted to form the conical portion 134 having a desired length and a slope at the end of the soot preform 130. Further, the iris frame 116 may be adapted to form the conical portion 134 at the top and bottom end of the soot 130.

At step 516, the soot preform 130 is dried by way of the drying furnace 118 to produce a dried soot preform 132. In particular, the drying furnace 118 may be adapted to eliminate physiosorbed moisture that is present in the soot preform 130. Moreover, the drying furnace 118 may be coupled to the extrusion apparatus 100 and 200. Further, the drying furnace 118 may not be coupled to the extrusion apparatus 100 and 200.

At step 518, one or more stabilized binders are eliminated, by way of the debinding furnace 122 along with other one or more additives from the dried soot preform 132 may be eliminated. In particular, the debinding furnace 122 may further be adapted to eliminate remaining physiosorbed and most of the chemisorbed OH molecules (i.e., chemisorbed moisture) from the dried soot preform 132. Moreover, the soot preform 130 or the dried soot preform 132 may be treated for about 1 to 3 hours in the debinding furnace 122 at a temperature range of about 800 Celsius to 1200 Celsius. The fourth outlet 122c may be adapted to exit debinded gases from the debinding furnace 122. And, upon removal of the one or more binders, the debinding furnace 122 may be adapted to produce the green body 136.

In an aspect of the present disclosure, the dried soot preform 132 may be transferred to the debinding furnace 122 when debinding of the dried soot preform 132 is required. Alternatively, the debinding furnace 122 may be coupled to the extrusion apparatus 100 and 200. In some other embodiments of the present disclosure, the debinding furnace 122 may not be coupled to the extrusion apparatus 100 and 200.

At step 520, the dried soot preform 132 or the green body 136 may be sintered by way of the sinter furnace 124 to obtain the glass preform 138 from the dried soot preform 132 or the green body 136. While sintering, the sinter furnace 124 is adapted to close pores in the soot preform 130. Alternatively, the dried soot preform 132 may be directly transferred to the sinter furnace 124 when debinding of the dried soot preform 132 is not required.

At step 522, by way of the draw furnace 126, may draw the glass preform 138 to manufacture the optical fiber 142. Specifically, to draw the optical fiber 142 from the glass preform 138. Furthermore, the conical portion 134 may be melted at high temperature to draw the optical fiber 142.

Furthermore, to extrude the clad soot, the steps from 502 to 508 may be repeated. Upon, pushing the silica slurry 102 towards the die header 114, the clad soot may be extruded. Specifically, the silica slurry 102 may eject out from the die header 114 to form the clad soot.

FIG. 6 is a flowchart illustrating a method for manufacturing a multilayer preform in accordance with an embodiment of the present invention. The extrusion apparatus 100 and 200 may employ following steps to manufacture the multilayer preform.

At step 602, the silica slurry 102 may be prepared by mixing with the one or more solvents, the one or more binders, and the one or more additives in the container (not shown). The silica particles may be mixed with the one or more solvents and the one or more binders to prepare the silica slurry 102.

At step 604, the silica slurry 102 may be transferred to the feed-hopper 104.

At step 606, the silica slurry 102 from the feed-hopper 104 may be fed to the barrel 106. The silica slurry 102 may be fed to the inlet end 106a of the barrel 106 under the action of gravity.

At step 608, the extrusion apparatus 100 and 200, by way of the barrel 106, may push the silica slurry 102 by way of the one or more screws 108a and 108b that may be disposed within the barrel 106. The one or more screws 108a and 108b may be adapted to rotate within the barrel 106 to push the silica slurry 102 towards the outlet end 106b of the barrel 106. From the outlet end 106b of the barrel 106, the silica slurry 102 may be pushed towards the die header 114, upon rotation of the one or more screws 108a and 108b.

At step 610, the extrusion apparatus 100 and 200 extrude the core rod 128 by way of the die header 114 to receive the silica slurry 102 from the outlet end 106b of the barrel 106. In particular, the silica slurry 102 may be cladded on the core rod 128. Moreover, the die header 114 may be adapted to extrude a layer over the core rod 128. The die header 114 may therefore be adapted to extrude multiple layers on the core rod 128 i.e., multiple layered core rod. Further, the multiple layered core rod 128 may then be used to form the multilayer preform.

At step 612, the extrusion apparatus 100 and 200 may coat by way of the die header 114, the clad soot over the core rod 128. The die header 114 may further be adapted to coat the clad soot over the outermost layer from the multiple layers that may be coated on the core rod 128. Moreover, the die header 114 may be designed such that the die header 114 co-extrudes the core rod 128 to obtain the multilayer preform. Further, the speed of feeding the layer over the core rod 128 may synchronize with the speed of extrusion of the clad soot. The synchronization in the speed of feeding the layer over the core rod 128 and the speed of extrusion of the clad soot eliminates stresses in the multilayer preform and ensures proper deposition of the clad soot over the core rod 128.

At step 614, the extrusion apparatus 100 and 200 may form the conical portion 134 by way of the iris frame 116 at the end of the multilayer preform. In particular, the iris frame 116 may be adapted to form the conical portion 134 having a desired length and a slope at the end of the multilayer preform. Moreover, the iris frame 116 may be adapted to form the conical portion 134 at the bottom end of the multilayer preform.

At step 616, the extrusion apparatus 100 and 200, dries the multilayer preform by way of the drying furnace 118. In particular, the drying furnace 118 may be adapted to eliminate physisorbed moisture that is present in the multilayer preform.

At step 618, the extrusion apparatus 100 and 200 eliminates by way of the debinding furnace 122 the one or more binders along with other one or more additives from the multilayer preform. Specifically, the debinding furnace 122 may further be adapted to eliminate chemisorbed OH molecules (i.e., chemisorbed moisture) from the multilayer preform. Furthermore, the multilayer preform may be treated for about 1 to 3 hours in the debinding furnace 122 at a temperature range of about 800° Celsius to 1200° Celsius. The fourth outlet 122c may be adapted to exit the debinded gases from the debinding furnace 122. The debinding furnace 122 may be, upon removal of the one or more binders, adapted to produce the green body 136.

At step 620, sinter the green body 136 by way of the sinter furnace 124 obtain the multilayer preform from the green body 136. While sintering, the sinter furnace 124 may be adapted to close pores in the multilayer preform.

At step 622, draw the multilayer preform is drawn by way of the draw furnace 126 to manufacture the optical fiber 142. Specifically, to draw the optical fiber 142 from the multilayer preform 132, the conical portion 134 may be softened in presence of one or more gases. Furthermore, the conical portion 134 may be melted at high temperature to draw the optical fiber 142.

In some aspects of the present disclosure, different kinds of dopants (such as but not limited to Fluorine, P$_2$O$_5$) and powders may be added in silica particles to prepare respective slurries such that the respective slurries form the multilayer preform.

Furthermore, to extrude the clad soot, the steps from 602 to 608 may be repeated. Upon pushing the silica slurry 102 towards the die header 114, the clad soot may be extruded. Specifically, the silica slurry 102 may eject out from the die header 114 to form the clad soot and deposit over the core rod 128.

Figure 7:
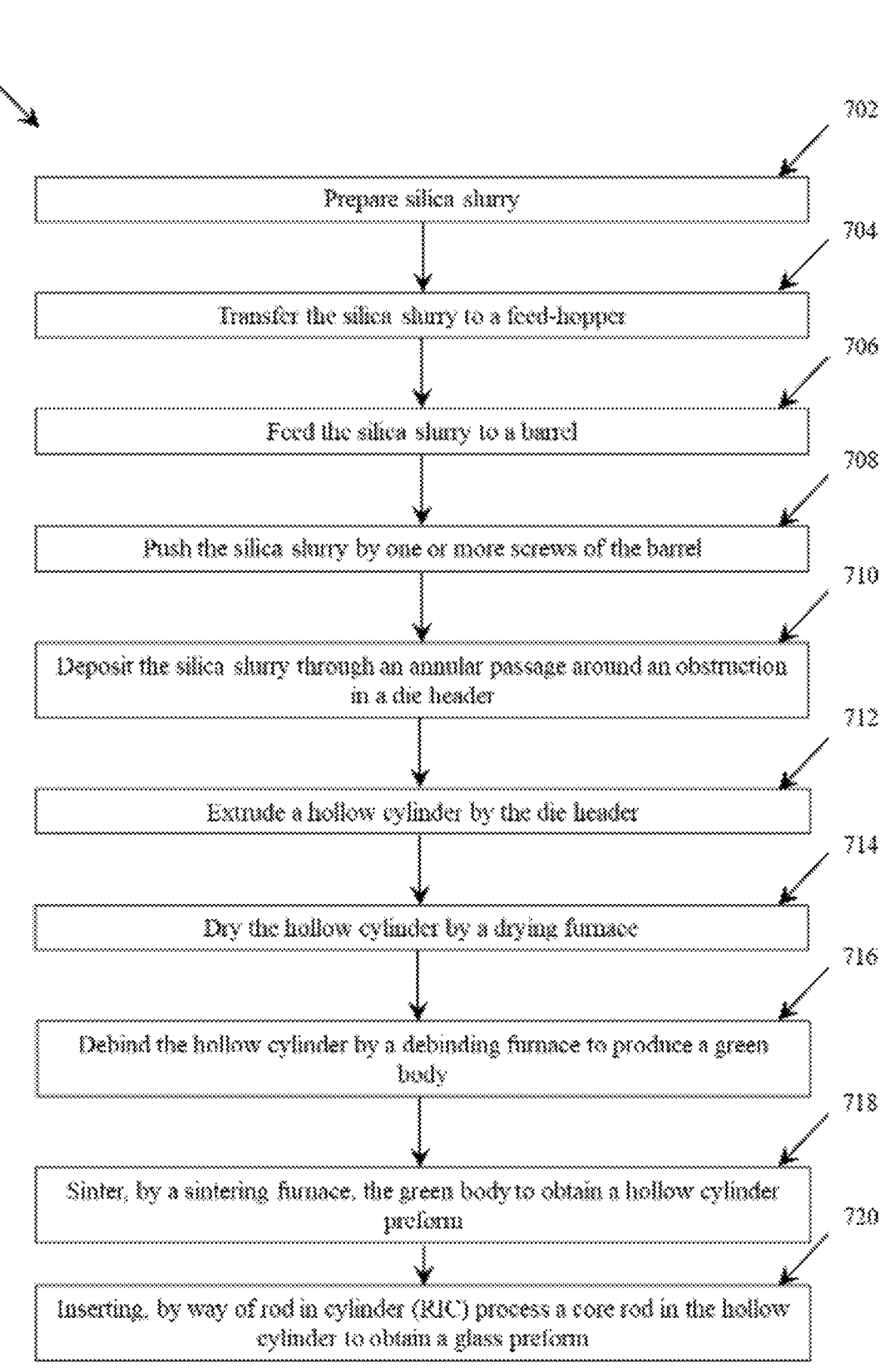
FIG. 7 is a flowchart illustrating a method for manufacturing a hollow cylinder preform in accordance with an embodiment of the present invention.

FIG. 7 is a flowchart illustrating a method for manufacturing a hollow cylinder preform in accordance with an embodiment of the present invention.

At step 702, the silica slurry 102 may be prepared by the silica particles may be mixed with the one or more solvents, the one or more binders, and the one or more additives in the container (not shown). The silica particles may be mixed with the one or more solvents, the one or more binders, and the one or more additives to prepare the silica slurry 102.

At step 704, the silica slurry 102 may be transferred to the feed-hopper 104.

At step 706, from the feed-hopper 104, the silica slurry 102 may be fed to the barrel 106. In particular, the silica slurry 102 may be fed to the inlet end 106a of the barrel 106 under the action of gravity.

At step 708, the extrusion apparatus 100 and 200, by way of the barrel 106, may push the silica slurry 102. In particular, the silica slurry 102 may be pushed by way of the one or more screws 108a and 108b that may be disposed within the barrel 106 adapted to rotate within the barrel 106. Upon rotation, the one or more screws 108a and 108b may be adapted to push the silica slurry 102 towards the outlet end 106b of the barrel 106. From, the outlet end 106b of the barrel 106, the silica slurry 102 may be pushed towards the die header 114, upon rotation of the one or more screws 108a and 108b.

At step 710, the extrusion apparatus 100 and 200, the silica slurry 102 is deposited by way of the die header 114, while manufacturing the hollow cylinder preform. In particular, the silica slurry 102 may be cladded through an annular passage around an obstruction in the die header 114. The obstruction may be the core rod 128. In some examples, the obstruction may be a mandrel that may be used instead of the core rod 128.

At step 712, the extrusion apparatus 100 and 200, by way of the die header 114, may extrude a hollow cylinder. In particular, the silica slurry 102 may eject out from the die header 114 to form the hollow cylinder.

At step 714, the extrusion apparatus 100 and 200, by way of the drying furnace 118, may dry the hollow cylinder. Specifically, the drying furnace 118 may be adapted to eliminate moisture that is present in the hollow cylinder.

At step 716, the extrusion apparatus 100 and 200, by way of the debinding furnace 122, may eliminate the one or more binders (for example stabilized binders) from the hollow cylinder. Specifically, the debinding furnace 122 may further be adapted to eliminate chemisorbed OH molecules (i.e., chemisorbed moisture) from the hollow cylinder. Furthermore, the hollow cylinder may be treated for about 1 to 3 hours in the debinding furnace 122 at a temperature range of about 800 Celsius to 1200° Celsius. The third outlet 122b may be adapted to exit the debinded gases from the debinding furnace 122. The debinding furnace 122 may be, upon removal of the one or more binders from the hollow cylinder, adapted to produce the green body 136.

At step 718, by way of the sinter furnace 124, may sinter the green body 136 to obtain the hollow cylinder preform.

Specifically, while sintering, the sinter furnace 124 may be adapted to close pores in the hollow cylinder preform.

At step 720, inserting, by way of rod in cylinder (RIC) process, the core rod 128 in the hollow cylinder to obtain the glass preform 138. The glass preform 138 may further be used to draw the optical fiber 142 from the draw furnace 126.

In some aspects of the present disclosure, to manufacture the hollow cylinder preform, an obstruction at the center of the die header 114 may guide the silica slurry 102 through the annular passage around the obstruction.

Figure 8:
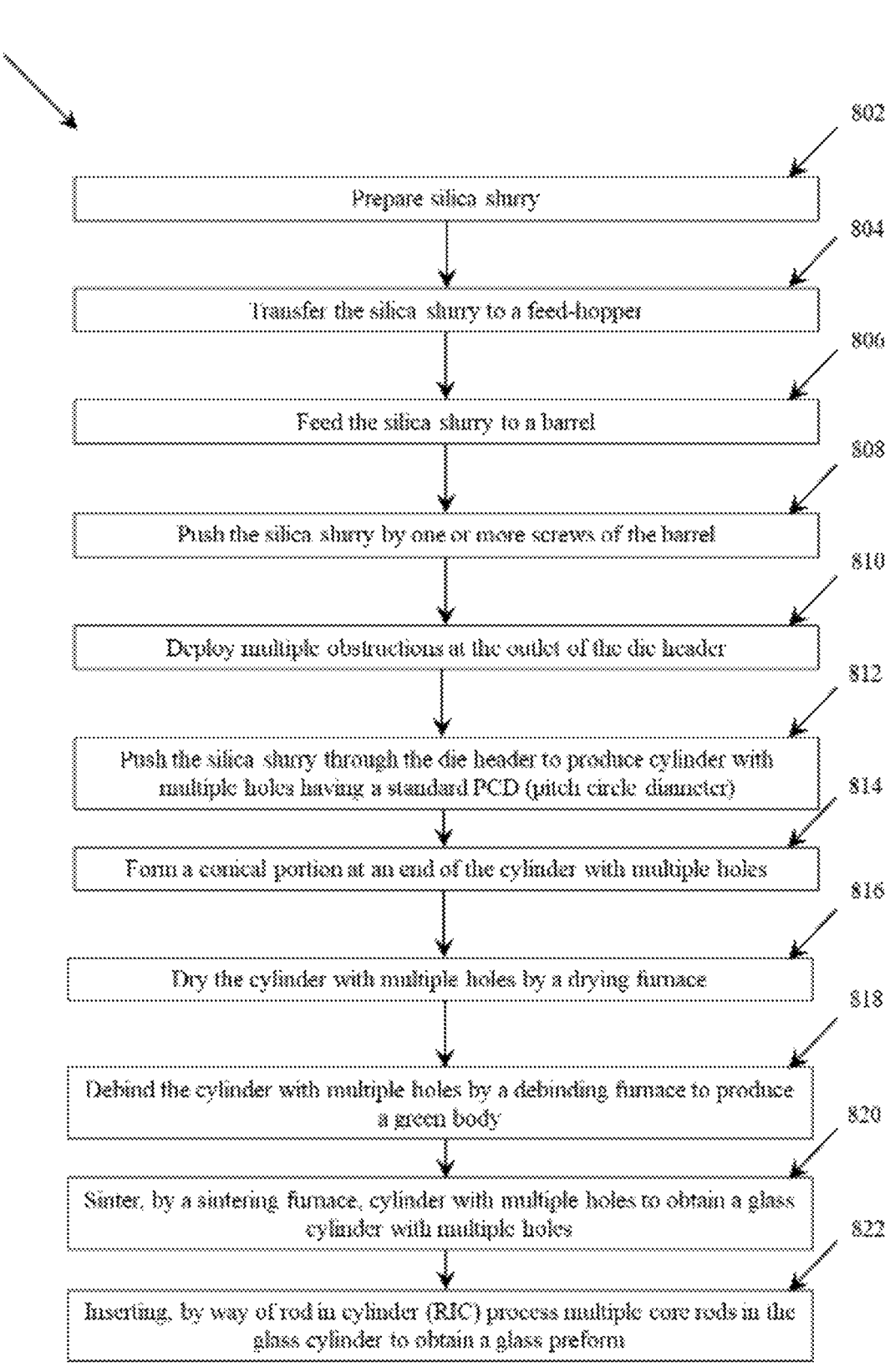
FIG. 8 is a flowchart illustrating a method for manufacturing a multicore rod preform in accordance with an embodiment of the present invention.

FIG. 8 is a flowchart illustrating a method for manufacturing a multicore rod preform in accordance with an embodiment of the present invention.

At step 802, the silica slurry 102 may be prepared by mixing, the silica particles may be mixed with the one or more solvents, the one or more binders, and the one or more additives in the container (not shown). The silica particles may be mixed with the one or more solvents and the one or more binders to prepare the silica slurry 102.

At step 804, the silica slurry 102 may be transferred to the feed-hopper 104.

At step 806, from the feed-hopper 104, the silica slurry 102 may be fed to the barrel 106. Particularly, the silica slurry 102 may be fed to the inlet end 106$a$ of the barrel 106 under the action of gravity.

At step 808, the extrusion apparatus 100 and 200, by way of the barrel 106, may push the silica slurry 102. Particularly, the silica slurry 102 may be pushed by way of the one or more screws 108$a$ and 108$b$ that may be disposed within the barrel 106. Moreover, he one or more screws 108$a$ and 108$b$ may be adapted to rotate within the barrel 106. The one or more screws 108$a$ and 108$b$, upon rotation, may be adapted to push the silica slurry 102 towards the outlet end 106$b$ of the barrel 106. From the outlet end 106$b$ of the barrel 106, the silica slurry 102 may be pushed towards the die header 114, upon rotation of the one or more screws 108$a$ and 108$b$.

At step 810, the extrusion apparatus 100 and 200, by way of the die header 114, may deploy multiple obstructions at the outlet of the die header 114. In particular, the die header 114 may be adapted to deploy multiple obstructions at the outlet of the die header 114 as per required pitch i.e., core to core spacing.

At step 812, the extrusion apparatus 100 and 200, may push the silica slurry through the die header 114 to produce cylinder with multiple holes having a standard pitch circle diameter (PCD).

At step 814, the extrusion apparatus 100 and 200, by way of the iris frame 116, may form the conical portion 134 at an end of the cylinder with multiple holes. Particularly, the iris frame 116 may be adapted to form the conical portion 134 having a desired length and a slope at the end of the cylinder with multiple holes. For example, the iris frame 116 may be adapted to form the conical portion 134 at the bottom end of the cylinder with multiple holes.

At step 816, the extrusion apparatus 100 and 200, by way of the drying furnace 118, may dry the cylinder with multiple holes. Particularly, the drying furnace 118 may be adapted to eliminate moisture that is present in the cylinder with multiple holes.

At step 818, the extrusion apparatus 100 and 200, by way of the debinding furnace 122, may eliminate the one or more binders (for example stabilized binders) from the cylinder with multiple holes to produce the green body 136. Particularly, the debinding furnace 122 may be adapted to eliminate chemisorbed OH molecules (i.e., chemisorbed moisture) from the cylinder with multiple holes. Moreover, the cylinder with multiple holes may be treated for about 1 to 3 hours in the debinding furnace 122 at a temperature range of about 800° Celsius to 1200° Celsius. The third outlet 122$b$ may be adapted to exit the debinded gases from the debinding furnace 122. Furthermore, the debinding furnace 122 may be, upon removal of the one or more binders, adapted to produce the green body 136.

At step 820, by way of the sinter furnace 124, may sinter the green body 136 to obtain a glass cylinder with multiple holes. Particularly, while sintering, the sinter furnace 124 may be adapted to close pores in the green body 136 to obtain the glass cylinder with multiple holes.

At step 822, inserting, by way of rod in cylinder (RIC) process, multiple core rods in the glass cylinder to obtain the glass preform 138. The glass preform 138 may further be used to manufacture the multicore rod preform.

Figure 9:
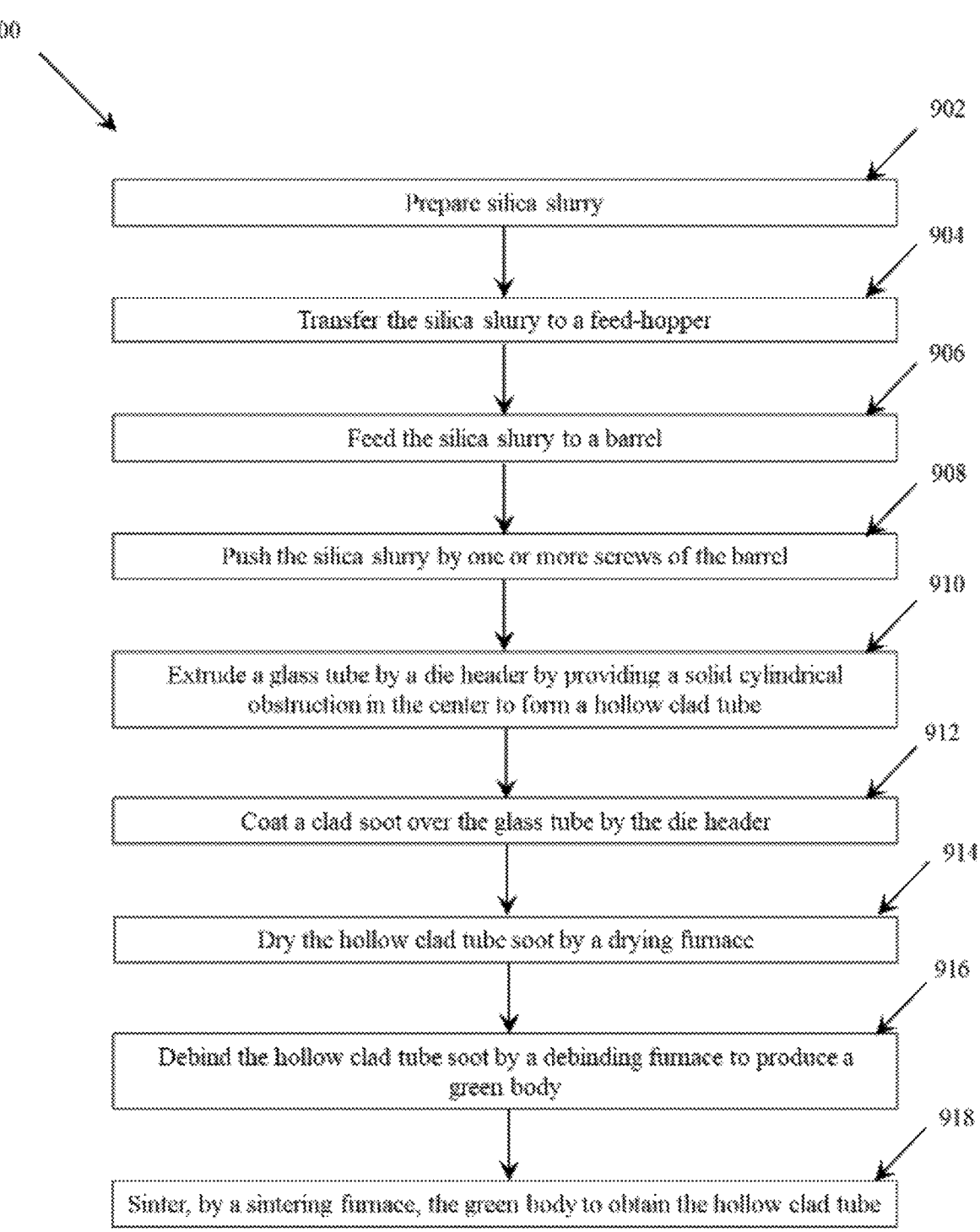
FIG. 9 is a flowchart illustrating a method for manufacturing a hollow clad tube in accordance with an embodiment of the present invention.

FIG. 9 is a flowchart illustrating a method for manufacturing a hollow clad tube in accordance with an embodiment of the present invention. At step 902, the silica slurry 102 may be prepared by mixing with the one or more solvents, the one or more binders, and the one or more additives in the container (not shown). The silica particles may be mixed with the one or more solvents, the one or more binders, and the one or more additives to prepare the silica slurry 102.

At step 904, the silica slurry 102 may be transferred to the feed-hopper 104.

At step 906, from the feed-hopper 104, the silica slurry 102 may be fed to the inlet end 106$a$ of the barrel 106 under the action of gravity.

At step 908, the extrusion apparatus 100 and 200, by way of the barrel 106, may push the silica slurry 102. In particular, the silica slurry 102 may be pushed by way of the one or more screws 108$a$ and 108$b$ that may be disposed within the barrel 106 that are adapted to rotate within the barrel 106. The one or more screws 108$a$ and 108$b$, upon rotation, may be adapted to push the silica slurry 102 towards the outlet end 106$b$ of the barrel 106. From the outlet end 106$b$ of the barrel 106, the silica slurry 102 may be pushed towards the die header 114 upon rotation of the one or more screws 108$a$ and 108$b$.

At step 910, the extrusion apparatus 100 and 200, by way of the die header 114, may extrude the hollow clad tube (glass tube). The silica slurry 102 may eject out from the die header 114 to form the glass tube to form the hollow clad tube. A solid cylindrical obstruction may be provided in the center of the die header 114, that facilitates the die header 114 to extrude the hollow clad tube. In some aspects of the present disclosure, multiple solid cylindrical obstruction may be provided to form the hollow clad tube with multiple holes in which multiple core rods can be inserted to obtain a multicore glass preform.

At step 912, the extrusion apparatus 100 and 200, by way of the die header 114, may coat the clad soot over the glass tube.

At step 914, the extrusion apparatus 100 and 200, by way of the drying furnace 118, may dry a hollow clad tube soot. Specifically, the drying furnace 118 may be adapted to eliminate moisture that is present in the hollow clad tube soot.

At step 916, the extrusion apparatus 100 and 200, by way of the debinding furnace 122, may eliminate the one or more binders (for example stabilized binders) from the hollow clad tube soot. Specifically, the debinding furnace 122 may further be adapted to eliminate chemisorbed OH molecules (i.e., chemisorbed moisture) from the hollow clad tube soot. Furthermore, the hollow clad tube soot may be treated for about 1 to 3 hours in the debinding furnace 122 at a temperature range of about 800° Celsius to 1200° Celsius. The third outlet 122*b* may be adapted to exit the debinded gases from the debinding furnace 122. The debinding furnace 122 may be, upon removal of the one or more binders from the hollow clad tube soot, adapted to produce the green body 136.

At step 918, the extrusion apparatus 100 and 200, by way of the sinter furnace 124, may sinter the green body 136 to obtain the hollow clad tube.

Thus, the extrusion apparatus 100 and 200, of the present disclosure reduces wastage and increases deposition efficiency from 50% to 90%. The extrusion apparatus 100 and 200 manufactures the optical fiber 142, without producing any combustible gas. Surface cracking of the soot preform 130 is reduced. In particular, the extrusion apparatus 100 and 200 reduces the scrap, which avoids wastage of raw material while producing the conical portion 134. For example, the reduction in wastage is from 20% to 10% or even less. Moreover, the extrusion apparatus 100 and 200 is used to manufacture a variety of articles, for example, handle rods, core preforms, core rods, multicore preforms, and clad preforms. Further, the iris frame 116 of the extrusion apparatus 100 and 200 facilitates in manufacturing of both, the core rods and a clad deposition on a cladding using a single extrusion apparatus.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed for:

1. An extrusion apparatus (100, 200) to manufacture a dried soot preform (130) characterized in that:
   a feed-hopper (104) adapted to feed silica slurry (102);
   a barrel (106) that is disposed beneath the feed-hopper (104) and adapted to receive the silica slurry (102), wherein the silica slurry (102) is pushed within the barrel (106);
   a die header (114) to extrude the silica slurry (102) such that the silica slurry (102) is cladded on a core rod (128) to form the soot preform (130),
   wherein the die header (114) comprises an iris frame (116); and the iris frame (116) further comprising:
   a plurality of vanes (302) such that each vane of the plurality of vanes (302) is adapted to move in a radial direction of the iris frame (116), wherein upon movement of each vane of the plurality of vanes (302), a central orifice (306) is created that exhibits a variable diameter, and
   wherein variation in the diameter of the central orifice (306) controls the diameter of the soot preform (130) to form a conical portion (134) at an end of the soot preform (130); and
   a drying furnace (118) that is disposed beneath the iris frame (116) and adapted to eliminate physisorbed moisture present in the soot preform (130) to produce a dried soot preform (132).

2. The extrusion apparatus (100, 200) as claimed in claim 1, wherein the extrusion apparatus (100, 200) comprises one or more screws (108) that are disposed within the barrel (106) such that the one or more screws (108) are adapted to mix the silica slurry and push the silica slurry towards the iris frame (116).

3. The extrusion apparatus (100, 200) as claimed in claim 1, wherein the extrusion apparatus (100, 200) comprises:
   a debinding furnace (122) that is coupled to the drying furnace (118) and adapted to eliminate one or more stabilized binders and other one or more additives from the dried soot preform (132) to produce a green body (136),
   wherein a glass preform (138) is obtained from the green body (136) such that an optical fiber (142) is drawn from the glass preform (138).

4. The extrusion apparatus (100, 200) as claimed in claim 1, wherein
   (i) 70% of silica particles of the silica slurry (102) have dimension greater than 16 microns and
   (ii) 30% of silica particles of the silica slurry (102) have dimension smaller than 16 microns.

5. The extrusion apparatus (100, 200) as claimed in claim 4, wherein the silica slurry (102) is prepared by mixing one or more solvents in a range of 10% to 30% with respect to the silica particles and the one or more solvents are one of, water-based solvents, alcohol-based solvents, and keto-based solvents.

6. The extrusion apparatus (100, 200) as claimed in claim 4, wherein the silica slurry (102) is prepared by mixing one or more binders in a range of 0.01% to 5% with respect to the silica particles and each binder of the one or more binders is one of, a polypropylene carbonate, a polyvinyl alcohol, a polystyrene, a camphor, a gelatin-based agar, and a stabilizing agent selected from dispersant, polymerizing initiator, and plasticizer.

7. The extrusion apparatus (100, 200) as claimed in claim 5, wherein the silica slurry (102) comprises the silica particles that lie in a range of 40% to 80%, the one or more binders that lie in a range of 1% to 3%, and the one or more solvents that lie in a range of 17% to 59%.

8. The extrusion apparatus (100, 200) as claimed in claim 1, wherein a diameter of the soot preform (130) is varied in a range of 35 mm to 350 mm with a deviation of +1 mm.

* * * * *